United States Patent
Axen et al.

(10) Patent No.: US 8,340,493 B2
(45) Date of Patent: Dec. 25, 2012

(54) AUTOMATIC GENERATION OF VIDEO FROM STRUCTURED CONTENT

(75) Inventors: Yaniv Axen, Tel-Aviv (IL); Shmuel Weller, Tel-Aviv (IL)

(73) Assignee: SundaySky Ltd., Tel-Aviv (IL)

( * ) Notice: Subject to any disclaimer, the term of this patent is extended or adjusted under 35 U.S.C. 154(b) by 614 days.

(21) Appl. No.: 12/309,034

(22) PCT Filed: Jul. 5, 2007

(86) PCT No.: PCT/IL2007/000843
§ 371 (c)(1),
(2), (4) Date: Oct. 22, 2009

(87) PCT Pub. No.: WO2008/004237
PCT Pub. Date: Jan. 10, 2008

(65) Prior Publication Data
US 2010/0067882 A1    Mar. 18, 2010

Related U.S. Application Data

(60) Provisional application No. 60/806,626, filed on Jul. 6, 2006.

(51) Int. Cl.
*H04N 5/765* (2006.01)
*H04N 5/93* (2006.01)

(52) U.S. Cl. ........................ 386/232; 386/281

(58) Field of Classification Search .................. 386/239, 386/232, 281, 278, 284, 280
See application file for complete search history.

(56) References Cited

U.S. PATENT DOCUMENTS

| 4,777,537 | A | * | 10/1988 | Ueno et al. ................. 386/239 |
| 4,847,693 | A | | 7/1989 | Eppolito |
| 6,462,754 | B1 | | 10/2002 | Chakraborty et al. |
| 6,487,564 | B1 | | 11/2002 | Asai et al. |
| 6,496,981 | B1 | | 12/2002 | Wistendahl et al. |
| 7,480,864 | B2 | * | 1/2009 | Brook et al. .................. 715/720 |
| 2001/0043219 | A1 | | 11/2001 | Robotham et al. |
| 2002/0003547 | A1 | | 1/2002 | Wang et al. |
| 2002/0112002 | A1 | | 8/2002 | Abato |
| 2003/0174869 | A1 | | 9/2003 | Suarez |
| 2005/0098023 | A1 | | 5/2005 | Toivonen et al. |
| 2005/0283730 | A1 | | 12/2005 | Uyttendaele et al. |
| 2007/0005795 | A1 | | 1/2007 | Gonzalez |
| 2009/0049075 | A1 | | 2/2009 | Kim et al. |

FOREIGN PATENT DOCUMENTS

| WO | WO 98/29835 | 7/1998 |
| WO | WO 01/77776 | 10/2001 |
| WO | WO 03/094519 | 11/2003 |

(Continued)

OTHER PUBLICATIONS

Communication Pursuant to Article 94(3) EPC Dated Apr. 23, 2009 From the European Patent Office Re.: Application No. 07766873.9.

(Continued)

*Primary Examiner* — Robert Chevalier

(57) ABSTRACT

Apparatus for generation of playable media from structured data, comprises a structured data reading unit for reading in of content of a first structure, a transformation unit for transforming said content into a second structure, said transformation comprising incorporating media play instructions, and a rendering unit for rendering content from the second structure using said media play instructions to generate playable media from the content.

73 Claims, 25 Drawing Sheets
(20 of 25 Drawing Sheet(s) Filed in Color)

FOREIGN PATENT DOCUMENTS

| WO | WO 2008/004236 | 1/2008 |
|---|---|---|
| WO | WO 2008/004237 | 1/2008 |

OTHER PUBLICATIONS

International Preliminary Report on Patentability Dated Feb. 11, 2009 From the International Preliminary Examining Authority Re.: Application No. PCT/IL2007/000843.

International Preliminary Examination Report Dated Mar. 5, 2010 From the International Preliminary Examining Authority Re.: Application No. PCT/IL07/00842.

International Preliminary Examination Report Dated Mar. 5, 2010 From the International Peliminary Examining Authority Re.: Application No. PCT/IL07/00842.

International Search Report Dated Sep. 4, 2008 From the International Searching Authority Re.: Application No. PCT/IL07/00842.

International Search Report Dated Jul. 25, 2008 From the International Searching Authority Re.: Application No. PCT/IL2007/000843.

Partial International Search Deated Jan. 17, 2008 From the International Searching Authority Re.: Application No. PCT/IL2007/000843.

Written Opinion Dated Sep. 4, 2008 From the International Searching Authority Re.: Application No. PCT/IL07/00842.

Written Opinion Dated Jul. 25, 2008 From the International Searching Authority Re.: Application No. PCT/IL2007/000843.

Froumentin et al. "Using XSLT and SVG Together: A Survey of Case Studies", Www.Svgopen.Org [Online], XP002487532, 6 P., 2002. Retrieved From the Internet: <URL:http://www.svgopen.org/2002/papers/froumentin_hardy_xslt/>.

Kaoru et al. "Automatic Conversion From E-Content Into Animated Storytelling", Entertainment Computing: ICEC 2005, XP002487533, 3711: 24-35, Sep. 28, 2005.

Lichtnegger "DisPlayList Interface Technology: Hard & Software Setup", Internet Article [Online], XP002487535, 2 P., 2004. Retrieved From the Internet: <URL:http://www.playlistnetwork.com/displaylist_technology.html>.

Tableau Media "Media Modeler Chosen by Streaming Magazine", Tableau Media Inc., Internet Article [Online], XP002487534, 3 P., May 1, 2001. Retrieved From the Internet: <URL:http://www.tableaumedia.com/tableau/press_main.htlm>.

Official Action Dated Nov. 28, 2011 From the US Patent and Trademark Office Re. U.S. Appl. No. 12/309,045.

Office Action Dated Jun. 18, 2012 From the Israel Patent Office Re. Application No. 196294.

Official Action Dated Jul. 12, 2012 From the US Patent and Trademark Office Re. U.S. Appl. No. 12/309,045.

* cited by examiner

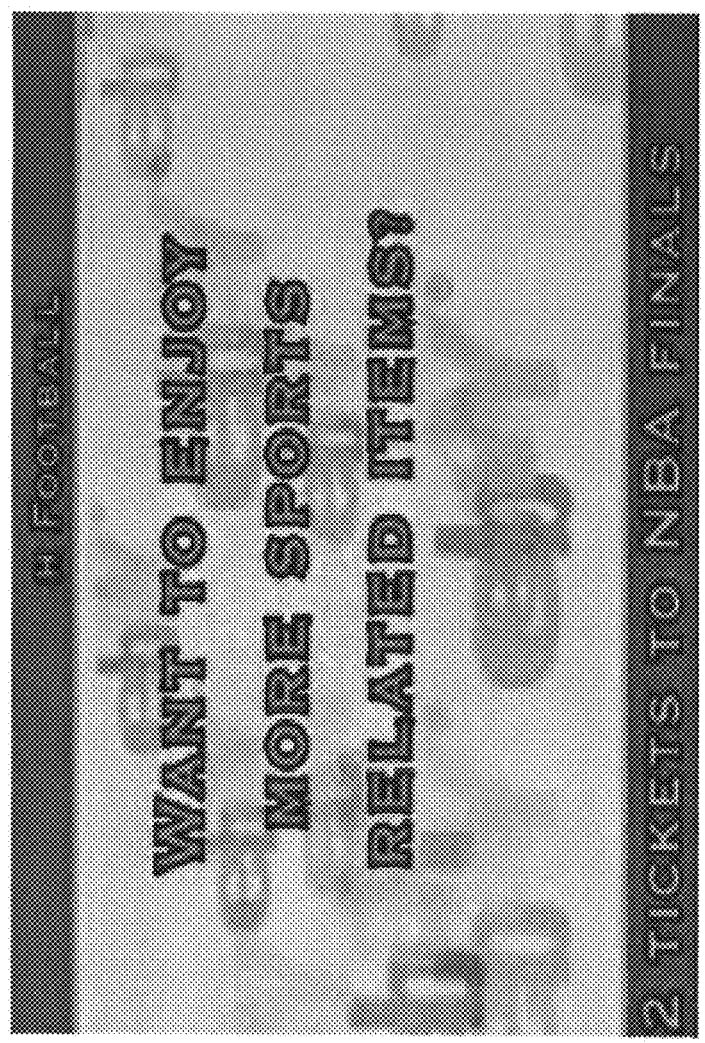

AUTOMATIC GENERATION OF VIDEO FROM STRUCTURED CONTENT

RELATED APPLICATIONS

This application is a National Phase Application of PCT Application No. PCT/IL2007/000843 having International Filing Date of Jul. 5, 2007, which claims the benefit of U.S. Provisional Patent Application No. 60/806,626, filed on Jul. 6, 2006. The contents of the above applications are all incorporated herein by reference.

FIELD AND BACKGROUND OF THE INVENTION

The present invention relates to apparatus and a method for automatic generation of playable media, and, more particularly, but not exclusively to automatic generation of playable video. This application is being co-filed with PCT/IL07/00842 filed 5 Jul. 2007, the contents of which are hereby incorporated by reference.

Today, video content delivered via TV, the Internet, mobile or any other video consumption medium, requires special production and creation of video content. This production includes creating the script, directing, shooting of the video, editing the video footage, designing the graphical elements, and more.

When creating video content from existing media elements, the same work is required, excluding actual filming of the video. However, there is a still need for scripting, editing and designing. The creator of the video still takes the flat media elements, which can include images, text, audio, animation and even video clips, organize them on a time line in a certain order and add effects such as narration, transitions between visual elements such as scenes or images, synchronize between audio and visual, create soundtrack, and more. The required tasks are typically carried out manually using well-known video editing tools. However, there are some problems in manual generation of video out of media elements:

Production consumes a lot of time, even if the actual shooting of the video is not required.

If there is a need to generate an endless stream of video, i.e. not just a short video clip but rather a TV channel which is played continuously, the problem becomes more severe. A large video production personnel would need to work around the clock to generate the video If the flat media elements out of which the video is generated are dynamic, i.e. might change through time and thus the video needs to be generated in real time, then producing the video manually becomes almost impossible. For example let us assume that the content which is used for generating the video is breaking news regarding an ongoing sports event, such as text updating the score of a game which is currently being played, and pictures taken from that game. The goal is to generate a video which reports about the game and is 100% up-to-date. The media elements are dynamic as the score changes all the time and new pictures from the game are added. The need here, is to generate the video based on the text and images on-the-fly and in real time. Doing this manually is almost impossible.

Many content providers, aggregators and owners hold a large amount of content, including video footage, audio, images, animation and text. Those media elements are typically stored in a database, content repository, Content Management Systems or simply on the file system. This content is purposed to be delivered to content consumers via different mediums such as mobile, PC, TV and the Web. However, the content is not organized or created as video content, meaning it is not organized on the time axis and does not constitute a video like experience, by which is meant that there is no continuity between the elements or that there is no storyboard.

One widespread example of a content repository is a Web site. Although the viewers of Web sites actually see the HTML pages through the operation of their browsers, in fact, in most cases, the HTML files represent a database of media elements. The HTML files are generated automatically based on that database. This is a very common scenario for many Web sites. The database out of which the HTML is generated can include text, audio, animation, images and video. There are plenty of automation tools which can integrate with such databases and generate HTML automatically which represents the media elements in the database. Those automatic tools usually include a template which defines a typical structure of HTML pages to be generated. The actual media elements which assemble that page are added automatically into the generated page. Thus a particular web site may have numerous pages, all however sharing certain basic structural elements. HTML can be structured dynamically and updated automatically. No such facility however exists for playable media such as audio or video.

Manual creation of playable media involves a scriptwriter defining what he needs to for the scene. There is no linearity in the instructions. While text is generally read in order, some stage instructions are intended to be carried out over the entire scene, and other stage instructions may be sequential. Yet other stage instructions may qualify following activities. The standard computer program comprises a series of instructions that are carried out in series. Even with variations such as object oriented programming, the computer still receives instructions sequentially. Thus script writing and computer programming are fundamentally different. That is to say the script for a play works differently from a computer program. Stage instructions are meant to be understood spatially and to be carried out simultaneously with other instructions and with reading of the text, and computer programs are linear. There is currently no known method of directly interfacing between the scriptwriter and the computer.

SUMMARY OF THE INVENTION

According to one aspect of the present invention there is provided apparatus for generation of playable media from structured data, comprising:

a structured data reading unit for reading in of content of a first structure, a transformation unit for transforming said content into a second structure, said transformation comprising incorporating media play instructions, and a rendering unit for rendering said content from said second structure using said media play instructions to generate playable media from said content.

According to a second aspect of the present invention there is provided a linear media generation apparatus for generating playable linear media from content, comprising:

a mark up unit for adding media playing instructions to said content, as mark up about said content, and a rendering unit for converting said content, according to instructions contained in said mark up, into a playable sequence.

According to a third aspect of the present invention there is provided a storage system for storing media content in play ready fashion comprising:

an input unit for input of content, and a markup unit for marking up said content with media play instructions, said media play instructions including a timing schedule.

According to a fourth aspect of the present invention there is provided a method for generation of playable media from structured data, comprising:

reading in of content data of a first structure, transforming said content data into a second structure, said transforming comprising incorporating media play instructions, and rendering said structured data from said second structure using said media play instructions to generate playable media from said content data.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified diagram showing apparatus according to a first embodiment of the present invention for transforming structured data into playable media.

FIG. 2 is a simplified diagram showing in greater detail the transformation unit of FIG. 1.

FIG. 3 is a simplified flow chart showing the process of transforming structured data into playable media, according to a preferred embodiment of the present invention.

FIG. 4 is simplified block diagram showing the apparatus of FIG. 1 at a greater level of detail.

FIG. 5 is a simplified block diagram showing a modification of the apparatus of FIG. 1 for use in different modes according to a preferred embodiment of the present invention.

FIG. 6 is a comparative diagram showing the similarity between an embodiment of the present invention and the use of HTML.

FIG. 7 is a balloon diagram illustrating various delivery methods for video produced according to embodiments of the present invention.

FIG. 8 is a simplified diagram showing three types of video generation according to a preferred embodiment of the present invention, the types categorized according to the intended targets.

FIG. 9 is a simplified block diagram illustrating a distribution arrangement for distributing video according to a preferred embodiment of the present invention over the cellular network and receiving interactive feedback.

FIG. 10 is a simplified block diagram of a web page from an electronic commerce website, which website is suitable for providing content to generate a video clip according to a preferred embodiment of the present invention.

FIG. 11 illustrates an opening screen for a possible video clip based on the web page shown in FIG. 11.

Figure 12:
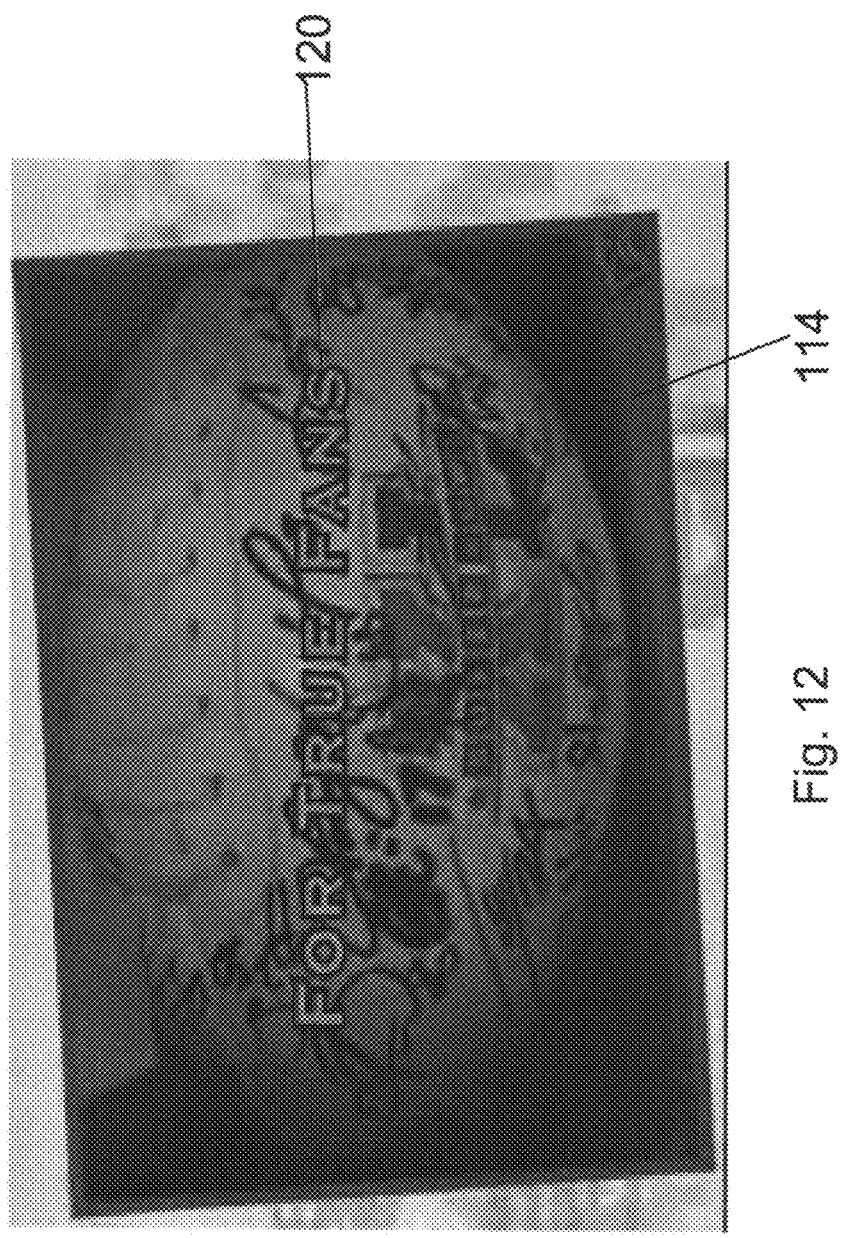

FIG. 12 is an illustration of how text may be superimposed over an image according to a preferred embodiment of the present invention.

Figure 10:
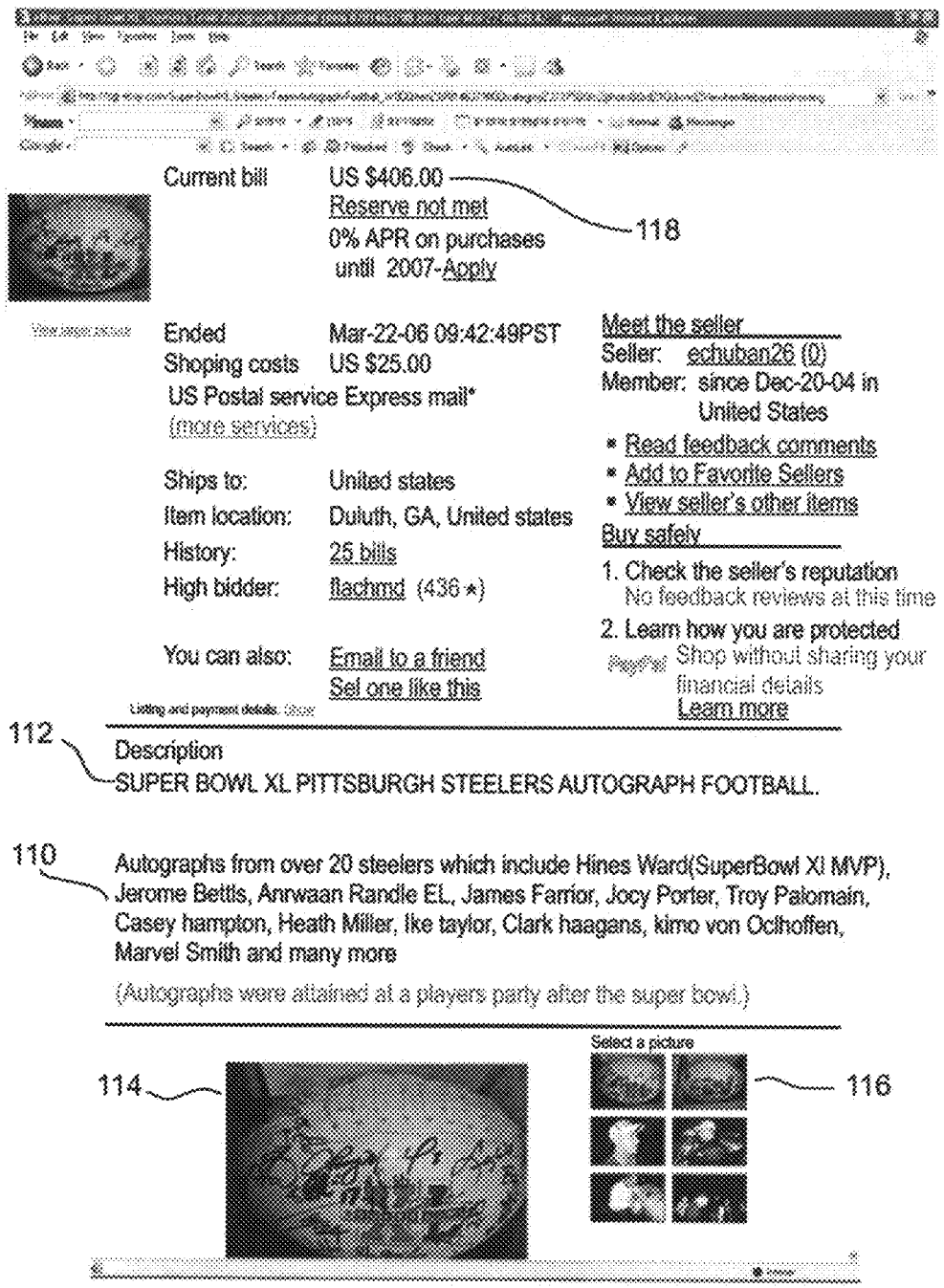
Figure 13:
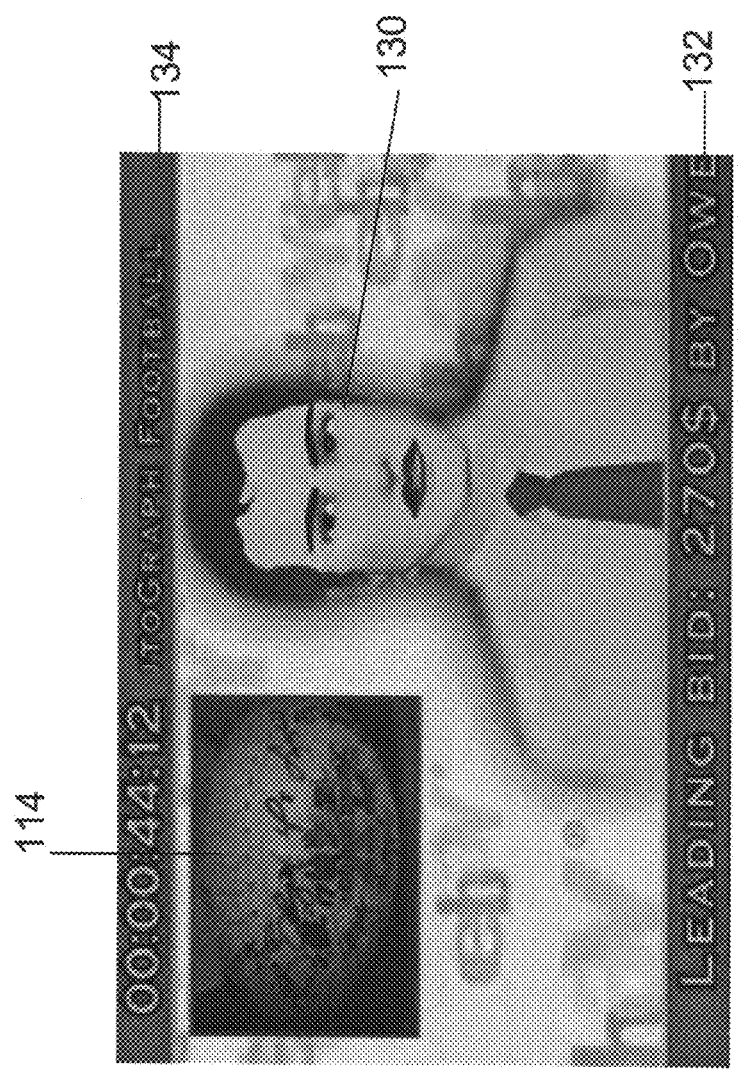

FIG. 13 is a simplified diagram showing a virtual narrator conducting an auction for the product illustrated in the web page of FIG. 10.

Figure 14:
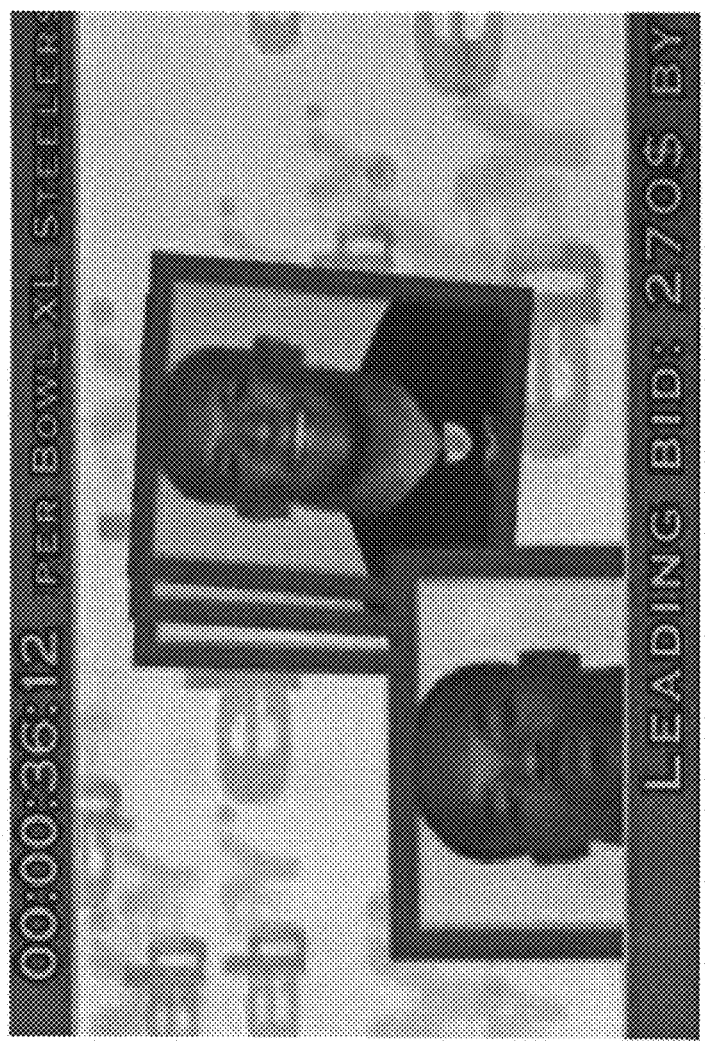

FIG. 14 illustrates a typical filler or enhancement scene that may be used with the auction, according to a preferred embodiment of the present invention.

FIG. 15 illustrates an exemplary closing scene according to a preferred embodiment of the present invention.

Figure 16A:
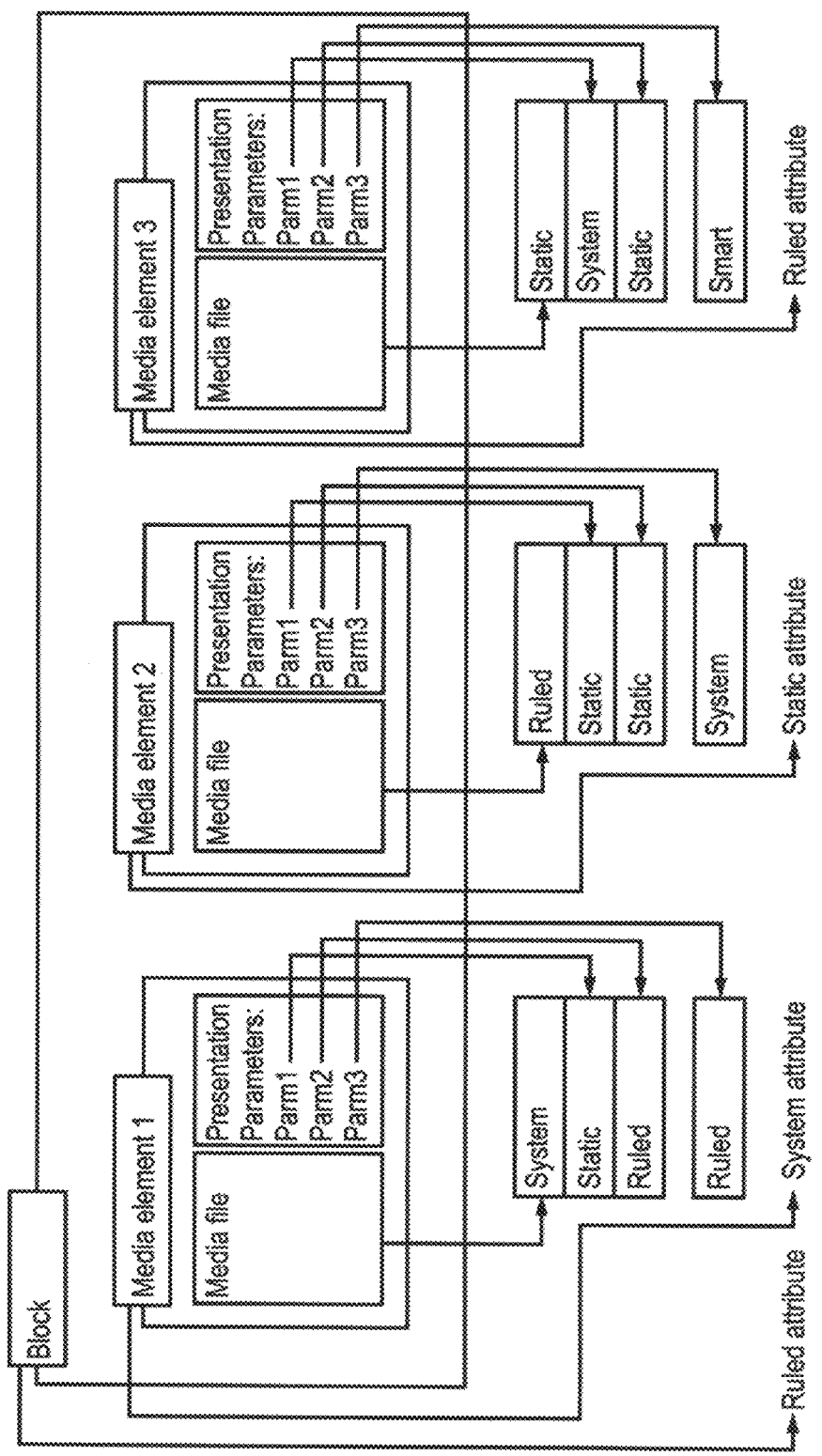

FIG. 16A is a simplified diagram illustrating an unresolved block of VSML according to a preferred embodiment of the present invention.

Figure 16B:
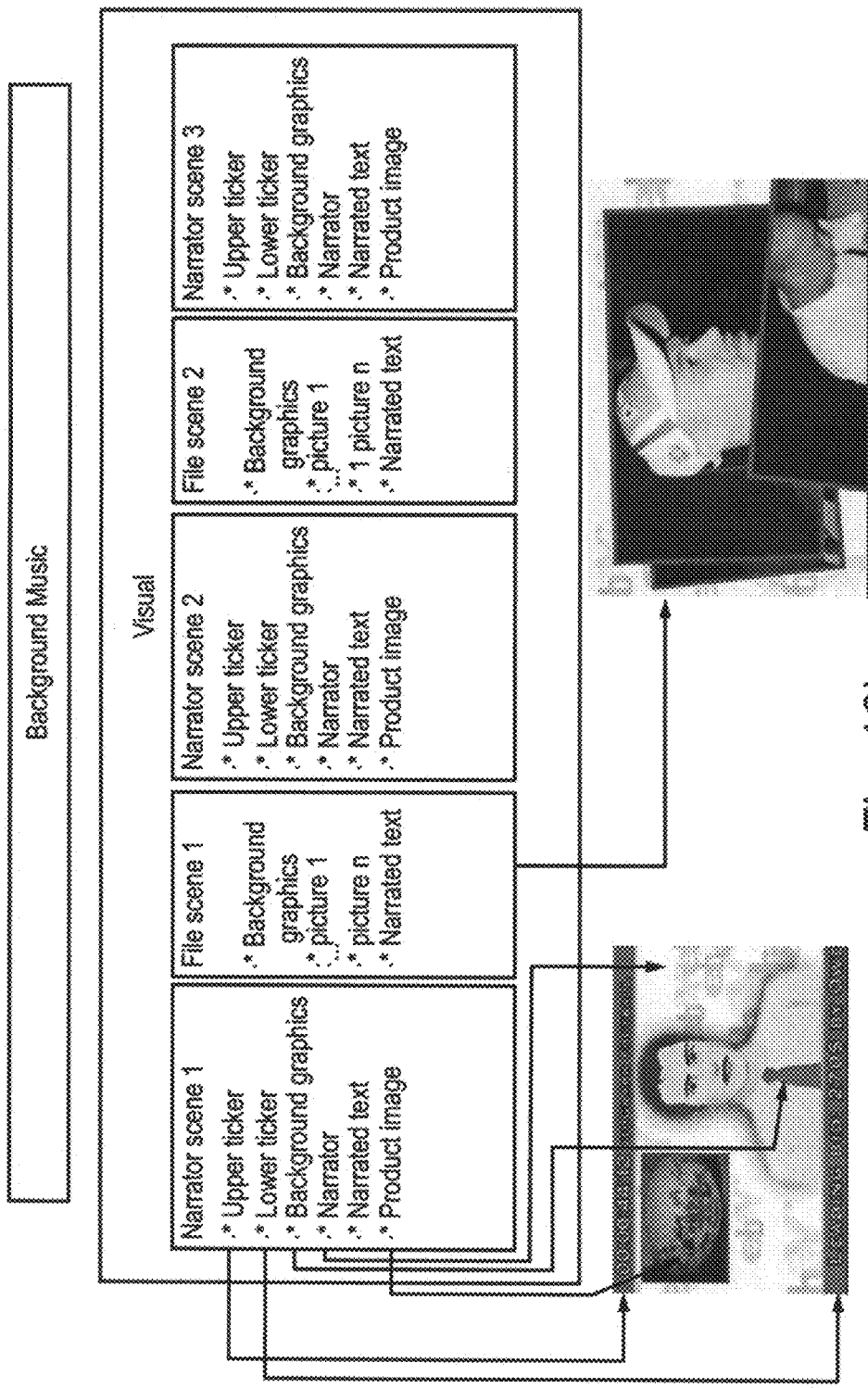

FIG. 16B is a simplified diagram illustrating how the auction may be defined using VSML according to a preferred embodiment of the present invention.

Figure 17:
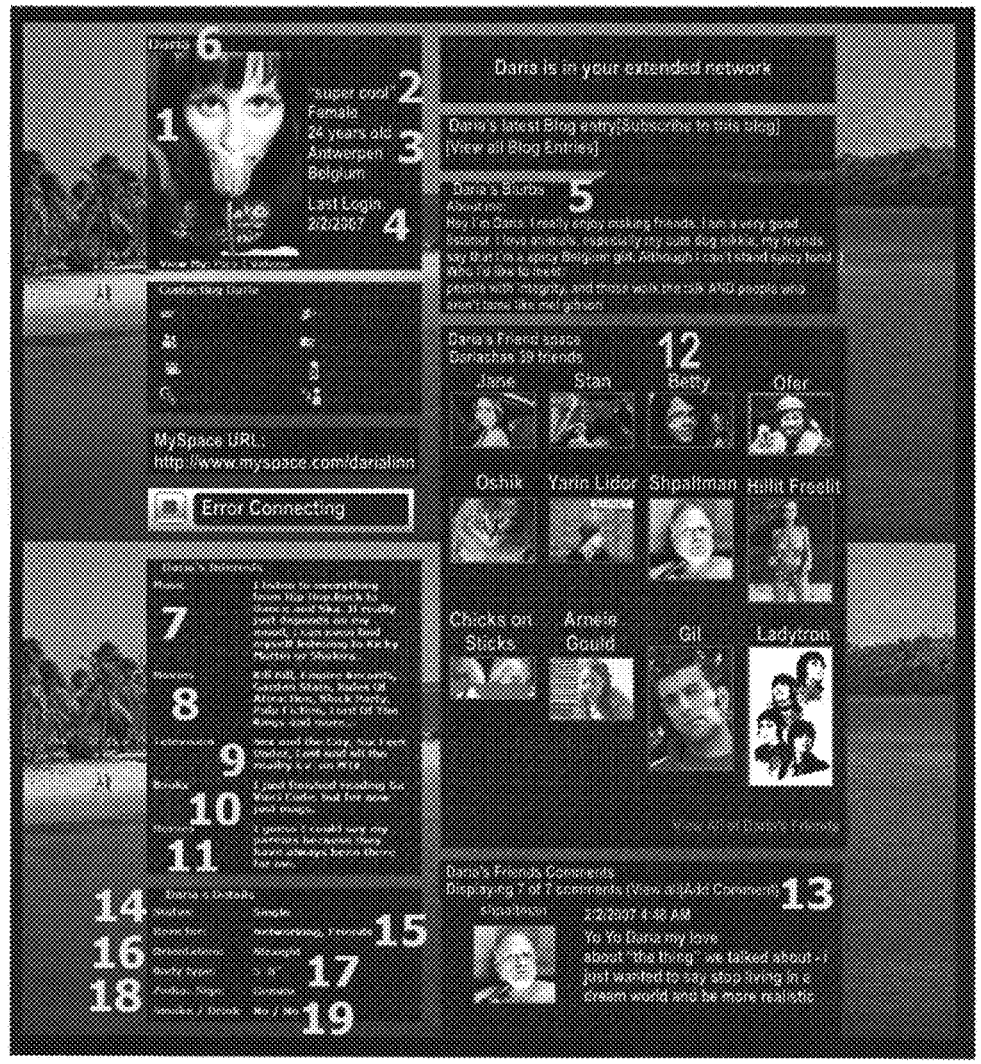

FIG. 17 illustrates a biographical page on a networking website, which forms the basis for automatic creation of a video clip according to a second example of the present embodiments.

Figure 18:
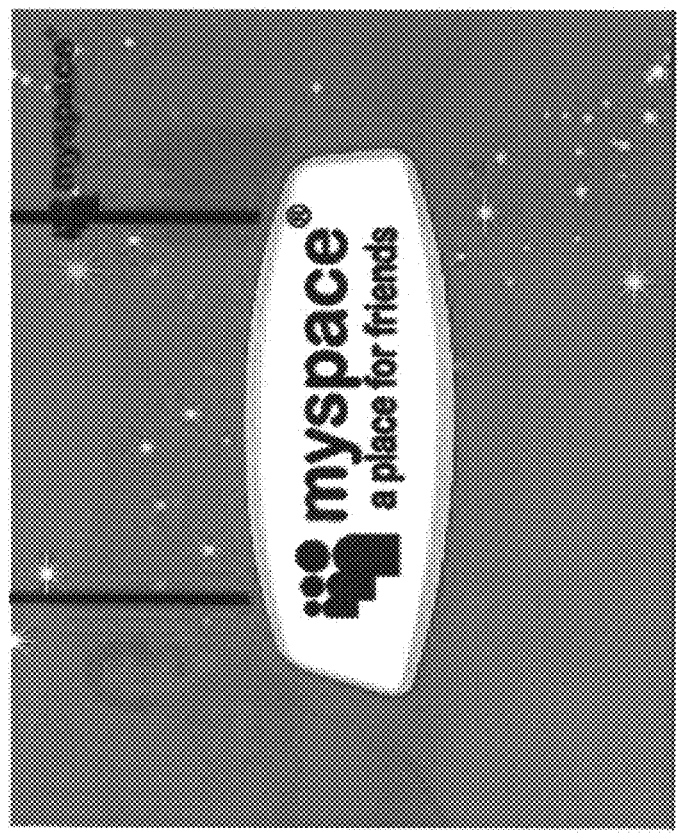

FIG. 18 illustrates an opening shot for the exemplary video.

FIGS. 19-24 are screen shots taken from successive scenes in such an exemplary video.

DESCRIPTION OF THE PREFERRED EMBODIMENTS

The present embodiments comprise an apparatus and method for automatic generation of playable media from non-playable or flat sources, and more particularly but not exclusively to the automatic generation of audio or video out of flat content.

An apparatus and method for automatic generation of video content out of flat content takes media elements such as images, videos, audios, animation and text, from a repository or a database, typically a Web site or a Content Management System, and uses the elements as building blocks for the video. The generated video can be dynamic, especially if the source is dynamic, and likewise may be interactive if the source is interactive. Known structural details of the source database are used to help in automatically structuring the video. The video media created is preferably video-like, which means that it is not a mere collocation of media items being shown in sequence, but rather that it includes scene changes such as cut and fade, camera instructions such as pan and zoom, and includes filler material to link between scenes according to some kind of storyboard.

The present embodiments thus enable the creation of new video content by using existing flat content, so that no manual production is required. An automatic system receives as input the media elements and uses them as building blocks for automatically generated video. No (or almost no) manual intervention is required while the video is generated (although some set-up efforts may be needed). This saves a lot of labor as automated software is able to generate the video much faster than any human worker.

In addition to being faster than any human being the present embodiments also allow production of large amounts of video content. In addition, the system can generate the video on-the-fly, in real time, with essentially no time delay so that the video can be updated as the source media elements change constantly.

An objective is to use existing content as the building blocks for video, and even to create a TV experience from a web site, the latter even though the content is not necessarily delivered through a traditional TV set. In other words, the idea is to redirect the use of existing flat content assembled from media elements and to build a video out of this content. The idea is to create an automatic method that would replace the human director, editor, screenwriter and creative designer and create the playable media in real-time. In that way, content providers, aggregators and owners can use their existing content for playable media without much further effort on their part and thus find an additional audience and means of delivery for their content.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
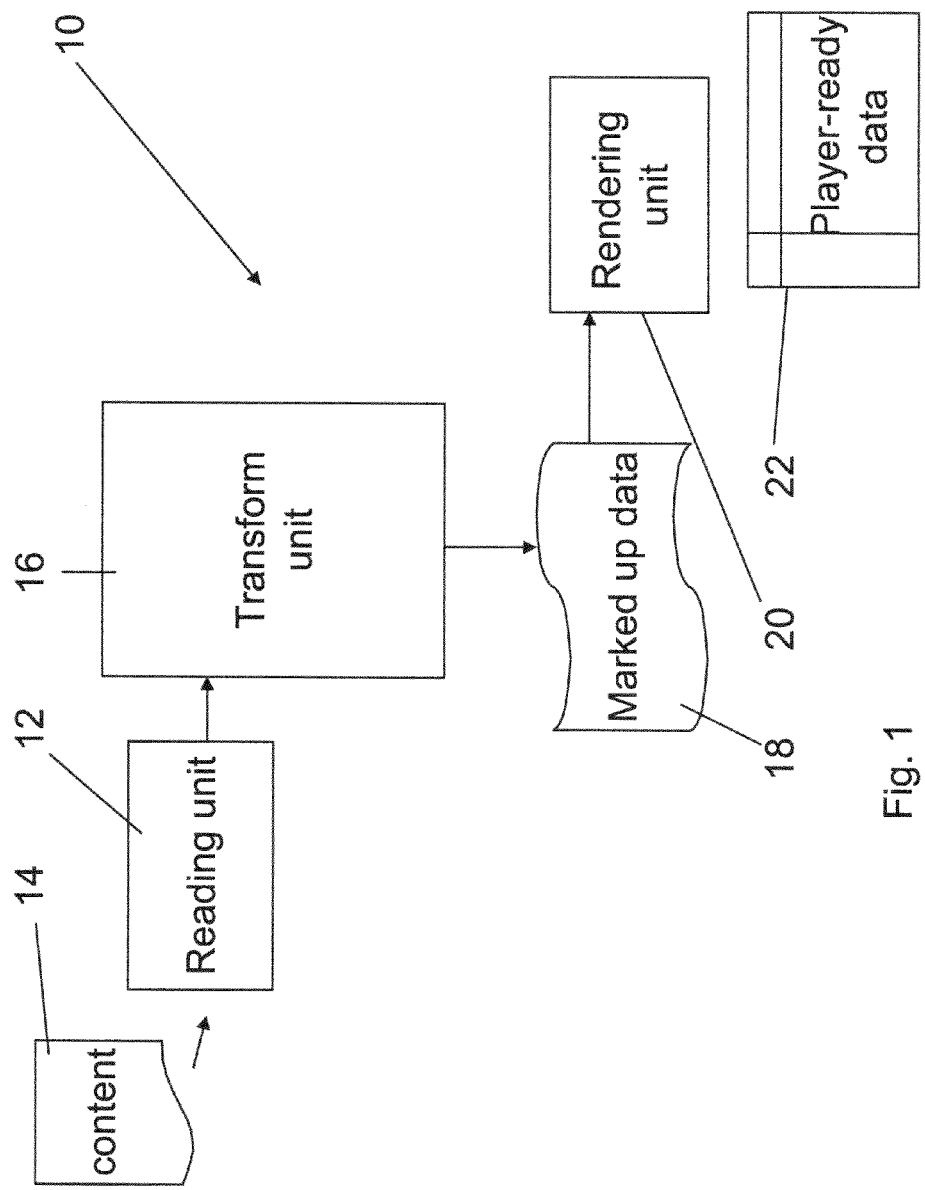

Reference is now made to FIG. 1 which illustrates apparatus 10 for generation of playable media from structured data. The apparatus includes a structured data reading unit 12 which reads in content 14. Content 14 is structured data typically from web sites and therefore in hypertext markup language HML. The content is typically structured at a further level depending on the website. Thus for example the content may be based on a data input form and thus follow the structure of the form. The embodiments are particularly but not exclusively applicable to websites that have personal user pages or that allow users to sell or auction products, where different pages possess repeated structures and common features.

Transformation unit 16 transforms the content into a second structure by incorporating media play instructions into the data. The media play instructions are preferably added as markup to the content in a manner that will be described in greater detail below. The resulting marked up data 18 may then be passed to rendering unit 20 which renders the content from the second structure using the media play instructions and generates playable media from the content. The playable media, or player-ready data may be video or audio or like playable content for play by a media player.

Typically, the first structure comprises content arranged in two dimensions, thus distributed over the surface of a page. Content on a page is not necessarily linear, and the user scanning a page is not bound in any way in terms of the order in which he reads text and views pictures. Playable media by contrast is a linear media, in the sense that playing is sequential, and timing is clearly defined. The transformation unit is designed to convert the HTML into a format which is linear. That is to say the second structure provides a linear description of the first structure.

The transformation furthermore applies to the content a timing framework which defines timing of play of the content.

On certain websites the content may be updated dynamically. Thus on a bidding site users may enter bids, leading to updating of the relevant web page. The reading unit 12 reads the incoming data in dynamically and carries out a dynamic transformation.

Many websites include web pages which are dynamically generated from a database managed by a content database management system. That is to say the actual web page shown depends both on stored static data of the web page and a determined identity of the user or some other like variable. Thus for example certain web sites show variations of the same page to gold users, silver users etc which are generated dynamically as the user accesses the page. In this case the structured data reading unit obtains the relevant data using the API of the website's content management system, which manages the dynamically generated web pages to obtain the data.

Figure 2:
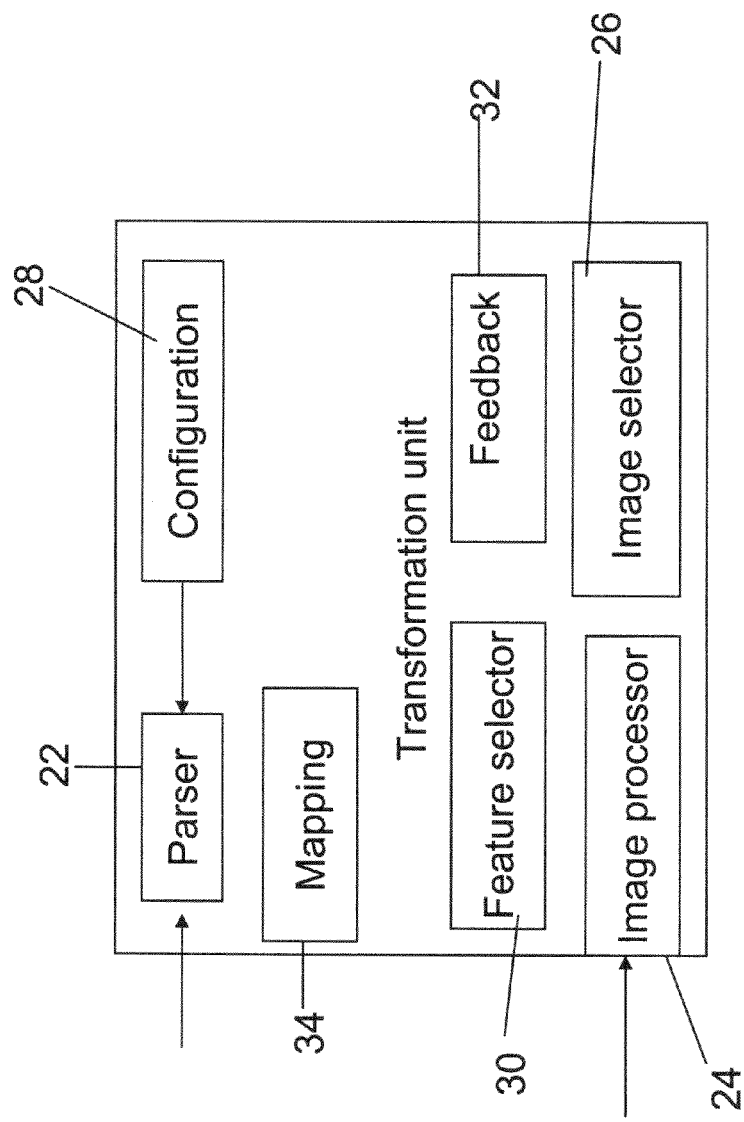

Reference is now made to FIG. 2 which shows the transformation unit 16 in greater detail. As mentioned the content is initially in a structure such as HTML and conforms to a predetermined format used by the particular web site. The transformation unit preferably includes a parsing unit 22 which understands the structure and format and parses the content. Parsing includes recognizing the different content items that make up the content.

As will be explained in greater detail below, media play commands come from the template/format created in the system setup phase. The template/format includes the logic to select and apply which commands are used in order to create the VSML. Typically the media play commands which the transform unit adds to the content from the template comprise what may be termed filler or enhancement instructions for providing additional play to link between the different content items. Thus the format may define that one content item is a photograph of the user and the following content item is the biography of the user. The bridge between the first and second items could include an enhancement instruction for an animated character to say "that was a photograph of X and now I would like to tell you a little more about X".

Of course the media play commands from the template may additionally comprise enhancement instructions for providing additional play within the different content items, and not just in between them as appropriate.

The media play instructions may comprise an instruction for generating a graph from tabulated data. Thus a web site that sells say cars may include numerous tabulated data items about the different cars. The tables may be transformed into graphs by such a media instruction and the user may be able to dynamically ask for graphs to be constructed to compare particular cars.

Typical web content may be multimedia but text is still a mainstay of the website. The media play instructions may include an instruction for conversion of text to speech, and even for reading of the speech by an animated character.

The media play instructions may even allow for a choice of animated characters, and may comprise an instruction for selection between such characters. A single clip made according to a given content item may use several animated characters sharing the content, much in the manner of news programs that have multiple presenters.

The transformation unit 16 may select between the alternative animated characters based on parsing of the content. Thus on an auction site for example it may be felt that a male character is more appropriate for sports items, whereas a female character is more appropriate for pop star memorabilia.

The web content, being multimedia, often includes still images. The media play instructions may comprise an instruction for displaying one such image for a certain amount of time, or for playing a succession of images. The images may be inserted into the field of view and then zoomed, all according to the instructions.

The image or images may be combined with information. In this case the media play instructions may define how the information is to be combined with the image. The information may be read out. Alternatively the information may be superimposed on the image as text. The images may be passed through image processor 24 which is able to determine regions of interest so that the text does not obscure say the person's face.

In many cases the content may include large numbers of images. The transformation unit may include an image selector 26 for selecting a subset of said images for display. The selection may be based on processing of respective images to determine suitability. For example a sequence intended to show a user's friends may be set to show pictures that have a good sized face centered within the image.

Display of the images may be as a slideshow and the media play instructions may comprise a slideshow instruction for playing the images in succession, that is for playing the slideshow.

As mentioned, the transformation unit includes parsing unit 22 for parsing content data. A configuration unit 28 may be provided to configure the parsing unit for different data structures, say associated with different websites. Thus the parsing unit may be configured to expect biographical information at one particular location for web pages from a certain web site, and may be set to find biographical information at a different location at another web site. At a third website it may not expect to find biographical information at all, but may know that at a certain location it will find news headlines.

In one embodiment the aim 1s to produce video clips. The clips are intended to look like filmed clips and thus the instructions include camera control instructions just as in the real media, the only difference being that the camera is a virtual camera merely defining a view point for the clip. Thus the media play instructions comprise camera control instructions for changing a point of view of the media play. Camera control instructions may include scene change instructions, such as cut, fade and merge. Likewise the instructions may include camera motion instructions such as pan, and camera lens instructions such as zoom.

As an example, photographs may be shown in a slide show. Each photo may initially viewed from a distance and then the camera zooms to a feature of interest identified by the image processor 24.

Preferably the transformation unit comprises a feature selector 30 for selecting between different play possibilities or play instructions. For example the feature selector may choose between such features as a slide show and a gallery display for showing a series of images. Alternatively the selector may choose between different animated characters, or may choose different view angles.

The following is a discussion of how the selector may go about making decisions. In the following the term "selector" is used to refer both to the image selector 26 whose task it is to select content for inclusion in the playable media and the feature selector 30 whose task is to choose between different play features.

In one embodiment the selector makes an initial selection on a random or substantially random basis, and provides different versions to different users.

Feedback unit 32 receives feedback from recipients indicating levels of interest in the respective versions. Thus it may receive feedback if a play clip is or is not watched to the end. The feedback unit is able to analyze from this which versions are preferred and which features are preferred and it can use the results of the analysis to optimize the selector to make selections which appear to be preferred by the end users. In this way the system can follow changes in taste and trends in a dynamic way, without human intervention.

In an embodiment, the transformation unit 16 comprises a mapping unit 34 for mapping the content as understood by the parser 22 into a tree. The tree comprises branches, and the selectors work by selecting branches for inclusion. The selection may be of all of the branches or it may be of just some of the branches. Thus in the multiple image example, each image may be a separate branch from a single node and the selector knows to choose no more than three branches from such a node.

In one embodiment, the selector uses an importance index based on the content and the structure in order to select between the different branches.

The importance index may itself assign values to the different branches, or to the content as a whole. Thus in an auction site for example, items above a hundred dollars may be assigned a high importance index indicating that most or all of the branches are to be included. Items below this value may be time limited so only the most important branches may be chosen. In the above example of the multiple images, the quality of the image, or the presence of a centrally located face, may be scored highly, and the three most highly scoring images may be selected for the slideshow.

It will be appreciated that in order to transform the data into linear media the branches have to be selected in a linear order, so that branches from a single node have to assigned an order.

As discussed, the output of the transformation unit is a renderable script including time information, stage and camera directions and content playing information. The renderable script contains the rendering instructions as mark up.

The result is typically audio or video.

The transformation unit thus functions as a mark up unit for adding media playing instructions to the content, as mark up about the content, and the marked up content is then fed to the rendering unit for converting the content into a playable clip according to instructions contained in the mark up. The playable clip may then be distributed around the web and played on standard media players.

As an alternative, the marked up content may be distributed around the web, and renderers may be supplied to users as client programs. The latter greatly simplifies network distribution issues as the marked up content requires less bandwidth than the playable media. The latter may especially be considered where the client devices are mobile type devices where available downloading bandwidth may be limited.

The marked up content is much more compact and thus more easily storable than the media itself. Thus the system may be regarded as a storage system for storing media content in play ready fashion.

Figure 3:
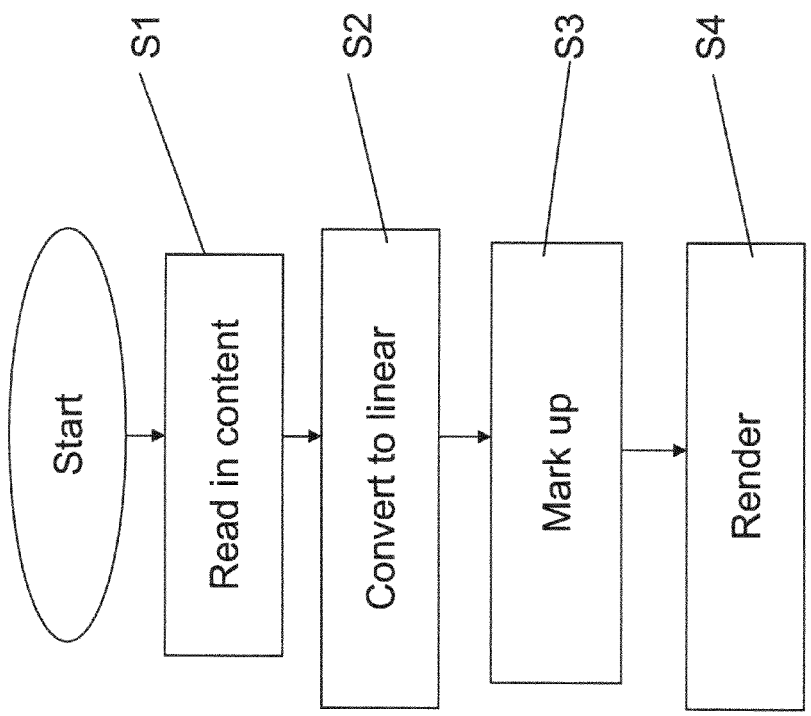

Referring now to FIG. 3, there is provided a method for generation of playable media from structured data, which comprises the steps of reading in of content data of a first structure S1, the first structure typically being that of a particular web site. Then in a stage S2, the content is converted into linear or single dimensional form, and the single dimensional form is transformed into a second structure in stage S3. The second structure is the marked up form referred to above, where the content is marked up with media play instructions including timing information. Finally the marked up form is rendered in stage S4 to form a rendered media clip.

Implementation

Figure 4:
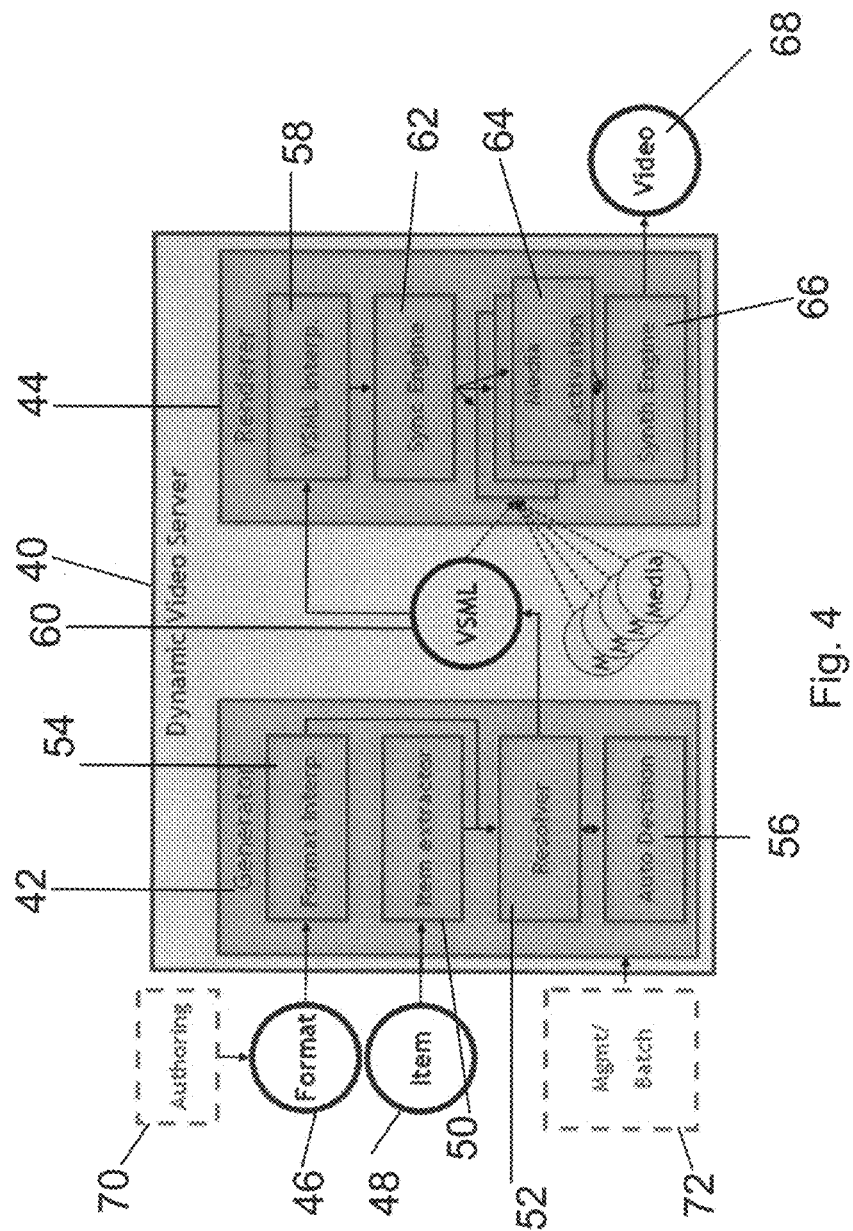

Reference is now made to FIG. 4, which is a simplified diagram illustrating dynamic video server 40 which provides a general implementation of a system according to the present embodiments. Generator 42 corresponds to the input and transform units referred to above, and the renderer corresponds to the rendering unit described above. The system generates the video according to an algorithm which comprises two main stages: the generation of the second structure, hereinafter VSML, or video scene markup language, and a stage of VSML rendering to create the actual playable medea. The full process will be described below but first we consider some of the terms used.

Item: a single logical element stored in the media repository. Each item is assembled of data and media elements (such as text, images, audio, animations, video files and so on) which represent that item.

The source of the item can be of various types:
Single or multiple HTML pages originated from the Web
Database (SQL or other) or CMS (Content Management System)
XML A single item may be a single blog, or a single item for sale or a user's web page.

Each item is transformed into a short video clip (typical clip will last 30-300 seconds).

Here are a few examples:
For Myspace, and like social network sites, each item represents a space, or a person.
For Amazon, eBay, or any other ecommerce site, each item represents a product for sale.
For IMDB.com, a database of the entertainment world, each item represents a movie (or an actor, or a director, etc)

Format: A generic template of VSML that holds the potential to generate an endless amount of videos. The Format is created by a creative person as part of the setup phase that is required per customer installation. The format contains rules and decision points that allow the system to generate a variety of video clips on the fly according to information coming from the item. The Format is a data unit which includes all the potential scenes, objects, media elements, behaviors, and so on which can be used for a certain content type. The format needs to be created per content type (e.g. format for myspace, format for all-music-guide, etc.) and it includes rules which determine how to make the decisions. The format may be considered as a big decision tree in which a choice is made between the nodes based on specific rules, so that different nodes are selected for different items. Following are the sources of information on which the rules may be based:

Information from the data content of the item (e.g. "if product category is jewelry choose a romantic sound track").

Information in the format itself (e.g. "background color of the ticker is the same as the color of the tie of the avatar").

Information coming from the Web site but that is not part of the item itself (e.g. "if the CD is part of the top 10 CDs sold this year then the avatar should say: '...'").

Information coming from external database. For example tapping into a DB with images, that we are in commercial agreement with, in order to obtain photos of actors, people in the news etc. or simply query for information VSML: VSML is short for Video Scene Markup Language. In order to implement the automatic generation of playable media, a language specialized for describing a video scene or clip is provided. This is an XML based language, herein called VSML, which includes all the building blocks of the video scene, and includes references to the media elements. Related languages exist, such as VRML (now X3D), BIFS (part of MPEG4), Flash, SMIL, and so on. However none of these languages are detailed and comprehensive enough to address video sequences in sufficient manner. The VSML takes flat or area based data such as a page, and defines it in linear terms with timing information and spatial information. VSML is provided with specific markup items to express ideas and include primitives coming from the domain of creative people, by contrast to pixels and frames to which current image-descriptive technology relates. VSML is provided with an object-oriented approach, so that it is able to describes scenes with entities like cast, setting and props and behaviours such as: "say", "move", "blink" and so on.

Sample statements in the language may include (used here in natural language):
The host will say "XXX" and then wink while music "YYY" is played in the background. When he says the word "ZZZ", then the lettering ZZZ will also appear on his right side.
The image will appear between the host and the plant.
Move the image sideways to the right so that its left end side is above the host's head.

More detail of the commands available from VSML are provided below.

Media Element: a single media element such as text, image, audio, animation or a video clip. A media element is usually stored as a single file but can also be stored in a database.

Video: the result of the rendering process is a stream of video data compressed (or uncompressed) and typically packaged in one or another standard format (e.g. as an AVI file). This output video can be integrated into any delivery system. For example the output video may be encoded to mpeg-4 for delivery on mobile, encoded to FLV in order to be uploaded to YouTube.com and so on.

Architecture

Returning now to FIG. 4, and the dynamic video generator algorithm works in two major steps and therefore is separated into two main modules:

Generator 42—Takes the format, and the data from the item, resolving the rules to generate VSML.

Renderer 44—Takes the VSML as input and renders to standard video. The video can then be used in any delivery system.

VSML Generator

The purpose of the VSML Generator is to generate VSML which describes a video scene/clip. The generated VSML does not contain any rules but describes a video sequence in a unique way. The input of the VSML is on one hand the basic format 46 on which the input web page is based, and which describes all the potential videos which can be generated for a given content type, and on the other hand the current item 48 for which a specific video is to be generated. An item includes all the data in the database/content management system that is associated with a certain item.

The Generator includes the following modules:

An Item Extractor 50 extracts content data from the item and creates a data structure which represents that item in a form that allows access by a resolver 52, further discussed below.

A Format Interpreter 54 analyzes the format and prepares a decision tree for the resolver 52.

The data of both the Format and Item serve as input to the Resolver 52. The Resolver resolves the rules which are included in the format according to the data of the item. In other words, the Resolver chooses a certain path in the tree of options which the format represents. The resolver can have three types of decisions according to the format specified, thus:

Static—The node is static therefore this decision applies to all the videos generated from this format. For example: The format defines sports related items so the Avatar is set to "male". All the movies generated from this format will have a male presenter.

Ruled—Condition using an "if" statement. For example: the format defines many kinds of items for sale. If the category of the product is "sport" use a male avatar. Otherwise use a female avatar.

System auto decision 56—Leave the decision to the system to decide for each individual item. For example: Choose some background music that best fits the keywords in this item.

End user—the decision is made by the end user, meaning the format cannot be resolved completely until someone makes a decision for the system. For example: the end user may select an avatar from the library and then video will be generated.

The Auto Decision module 56 is activated when a certain decision needs to be made in the format, however the format does not include a rule which determines how to make that decision, but rather specifies that the system should make that decision automatically.

VSML Renderer 44

The objective of the VSML Renderer is to translate the VSML to a visual video stream. The renderer includes the following modules:

A VSML interpreter 58—takes the VSML 60 as input and breaks it up into scenes and objects for rendering.

A synchronization engine 62—manages the different media activation tasks and tells each media activation engine what it should do. For example: for an avatar it builds the script that includes the sentences that need to be said, the gestures with time stamps and so on.

Media activation engines 64 are a series of media engines and API's that control different objects in the scene. For example: Adobe AfterEffects for text effects. Flash for animations. Each engine knows how to transfer instructions and get feedback and control the media object in real-time so that it plays its role in the scene.

A synthesis engine 66—After all the actors or media engines 64 have played their part and all of the different parts have been created, avatar, background, music, animation, effect, there is a step that composites the entire scene, frame by frame to generate a standard video file, and this step is carried out by the synthesis engine 66 to produce an output of video 68. Instead of video the output could be any other playable media, such as audio.

Dynamic video server 40 is preferably additionally associated with an Authoring Environment 70, which may be located on the server or on a client computer of the end user of the server. The authoring environment is a tool that allows a basic video format to be created on the basis of the kinds of items to be covered and allows animated characters and the like to be created for the video clips. More particularly, the authoring environment is a visual tool that acts as an entry point for the system and helps creative people create the video format for a particular site. The authoring environment encapsulates and supports the methodology required to create a format. The methodology is different from the conventional linear video creation methodology. Among other things, the environment helps creative people identify the interesting information coming from the item, and guides them through the process of creating a decision tree that describes the web format and adds options to allow the different items to be dealt with in a rich and meaningful way.

A management/batch tool 72 is a web based application that allows an admin level user to control the system and manage batch assignment. See more information in "administration station" scenario in the activation modes section below.

Figure 5:
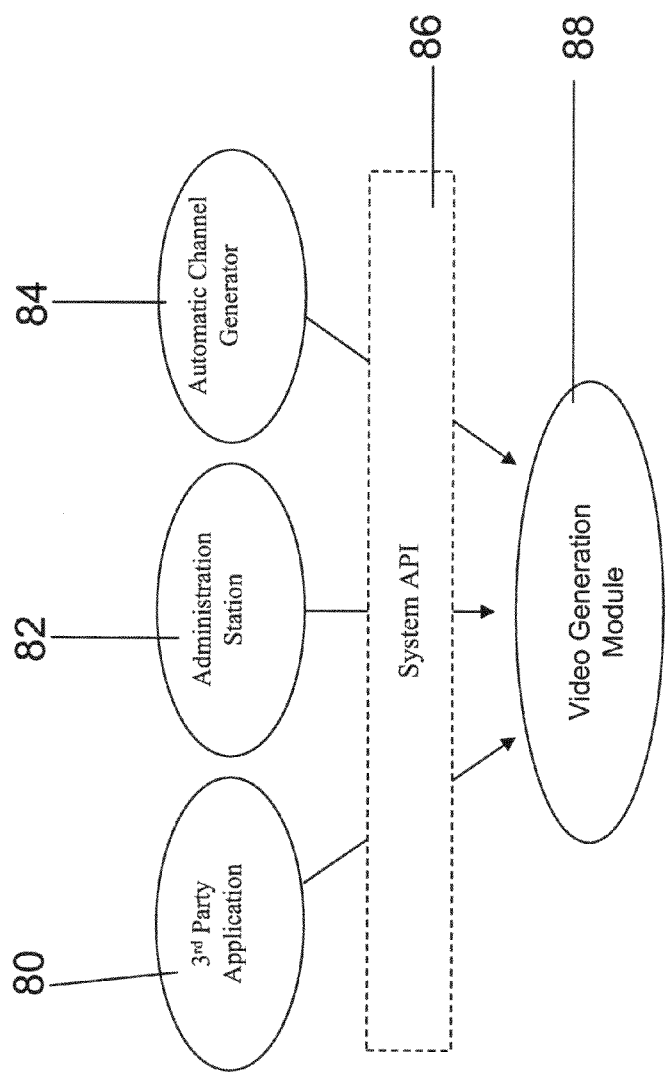

Reference is now made to FIG. 5, which is a simplified diagram showing features provided with the automatic video generation system to allow the automatic video system to interact in different ways with web infrastructure to produce different results according to preferred embodiments of the present invention. The system may work with a third party application 80, with an administration system 82 or with an automatic channel generator 84, as will be explained below. Each of the above interfaces with the system API 86 in order to exert some degree of control over the video generation module 88.

The automatic video server system may be used or activated in one of the following ways:

As a stand alone module

As a stand-alone module, the automatic video generation is basically a command line executable/engine which receives as input the item and the format and generates video accordingly. The command line can be activated via the simple DOS prompt or via a simple UI application. The input is preferably provided as follows:

Format: a URI directed to a file

Item: in one of the following—

HTML (either local or remote)

XML

Reference to a database base entry

By an administration station
- When operated by an administrator, the automatic video generation system may be used by the end user/customer to generate multiple videos periodically
- The end user, typically the person who is in charge of the video content of the site, uses the GUI of an administration station to do the following:
  - choose the items for which he wishes to generate video (e.g. all the mp3 products)
  - Define some of the settings (e.g. choose the avatar to be used)
  - Activate the system to generate video in a batch mode
- In order to allow external control of some of the video settings, such as for example which avatar to use, the automatic video generation system preferably provides an API command or series of commands which enable interference in the decision making process of the Resolver.
- The administration station may also provide notifications regarding successes and failures of the video generation processes.
- The administration system may also allow the end user to provide settings for the locations of the output videos, such as the structure of the file system.
- The administration station may also offer options to schedule batch video tasks (e.g. every midnight, only in weekdays and so on)

As an external application
- In the external application mode, a 3$^{rd}$ party application may activate the automatic video generation system to generate video for a specific item.
- The most typical example for this scenario is a social networking site in which people generate their own web pages according to a format provided by the site, which may be a loose or a tight format. The site provider then independently generates videos from the HTML generated by the site users, so that in effect the users generate their own videos.
- Such a site may provide an HTML based Wizard which provides control over some of the video attributes. The back-office of the site then activates the automatic video generation system while using the Resolver API to feed in any input of the end user. If the end user is the site user then this allows the site user to provide inputs into the decision making process as to how his video can be constructed. Thus the end user may choose his own avatar or the like.

Automatically
- The automatic video generation system may also be provided in automatic mode and may be run automatically to generate a video channel assembled of multiple video clips.
- A typical example is an MTV like channel, in which the automatic video generation system chooses songs from a music site, say myspace music and generates clips for them. The accumulation of clips may be assembled into a music channel. Another example is the automatic construction of a Shopping Channel whose individual items are extracted from an e-commerce site such as eBay.

In all of the examples above the architecture is substantially that shown in FIG. 5.

The System API 86 preferably allows the following:
Activation of the video generation module
Setting the item(s) for which video clip(s) are to be generated
Controlling the video attributes.

Additional Enhancements

The system is preferably enhanced to support certain additional capabilities.

VSML Streaming: in a VSML streaming embodiment, the video is both generated and played in real time. A typical example for such an enhancement is a video which is influenced by viewers' interactions. Viewers watch the video, interact (e.g. place a bid, participate in a poll) and the video is updated accordingly. In this case the VSML is generated directly from the user input and furthermore is generated as a stream and not as a closed file.

Video Regeneration: In an enhancement referred to as video regeneration, the same video is generated multiple times with minor modifications. For example, the same video is generated with—
Different advertisement
Different price tags for a product
Different user ratings In video regeneration it is clear for performance and resources reasons that it is not desirable to regenerate the entire video from scratch. Rather the regeneration system uses already existing video segments and merely replaces or updates the specific segments that need to be replaced or updated. One way of doing this is to cache the generated video segments cached so as to reuse them in the future. The system may support an input request for regeneration of existing video.

An alternative way of regeneration of video is to cache the VSML and make the modifications to the VSML. Then rendering may be carried out using the modified VSML.

The present embodiments thus provide an automatic system which uses structured data or a database to create video via a markup language. There is a certain similarity between this and the creation of HTML which then gives rise to page views via a browser. However the similarity is only in the general concept, not in the implementation, as generating HTML and generating video are very different from each other.

Figure 6:
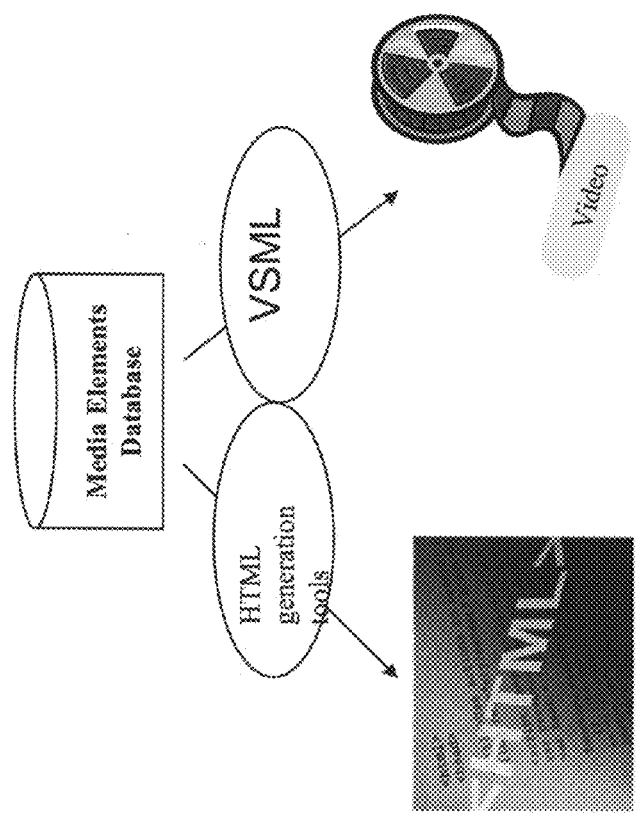

Attached FIG. 6 shows two paths, an HTML generation path and a video generation path in parallel to illustrate the similarity.

With HTML however the source of the media elements is not necessarily a database which stands behind a Web site. The source can be any repository of media elements and construction of HTML generally, but not always, requires a high degree of user input.

Generated Video Look & Feel

The look and feel of the generated video may be determined by the creative activities of the end-user of the automatic video generation system of the present embodiments. The system comprises the authoring tool discussed above to allow a human user to define the way the video is generated based on the media elements. The system is able to learn from creative user inputs, in that it is able to add them to decision trees so that over time an increasingly sophisticated and rich video look & feel is arrived at. Thus a web site can be converted into a TV like experience for the viewers of the video, even if the video itself is not necessarily consumed via a traditional TV set.

We now take for example a non-rich video experience to show how it is different from the present embodiments. We assume the media elements out of which the video is generated are images and audio. In the generated video the images can be displayed one after the other using graphical transition between them, a simple fade or dissolve, while the audio is playing in the background. Such a "dumb" system definitely creates a video experience which might be interesting but is not very rich. The storyboard in such a case is very limited and the graphical elements that are used are not richer than what was originally in the database. The present embodiments provide for a video experience which is richer. The storyboard may be more advanced and the video may include additional media elements such as a virtual narrator, and other media elements such as background music, captions and so on, which was not originally in the database.

The ability to create a storyboard allows the generation of a video clip that can have a TV look and feel. The TV look and feel stems from the inclusion of elements such as promos, intros, interludes, intermediate entertainment elements, and so on. The system may use graphical and media processing engines to create such a TV look and feel. This includes virtual narrator (e.g. OddCast), virtual studio (e.g. VizRT, ORAD), text to speech engine (e.g. AT&T, IBM, Nuance), image processing engines (e.g. Canopus), video processing engines (e.g. Avid), and so on.

Delivery of the Video

Figure 7:
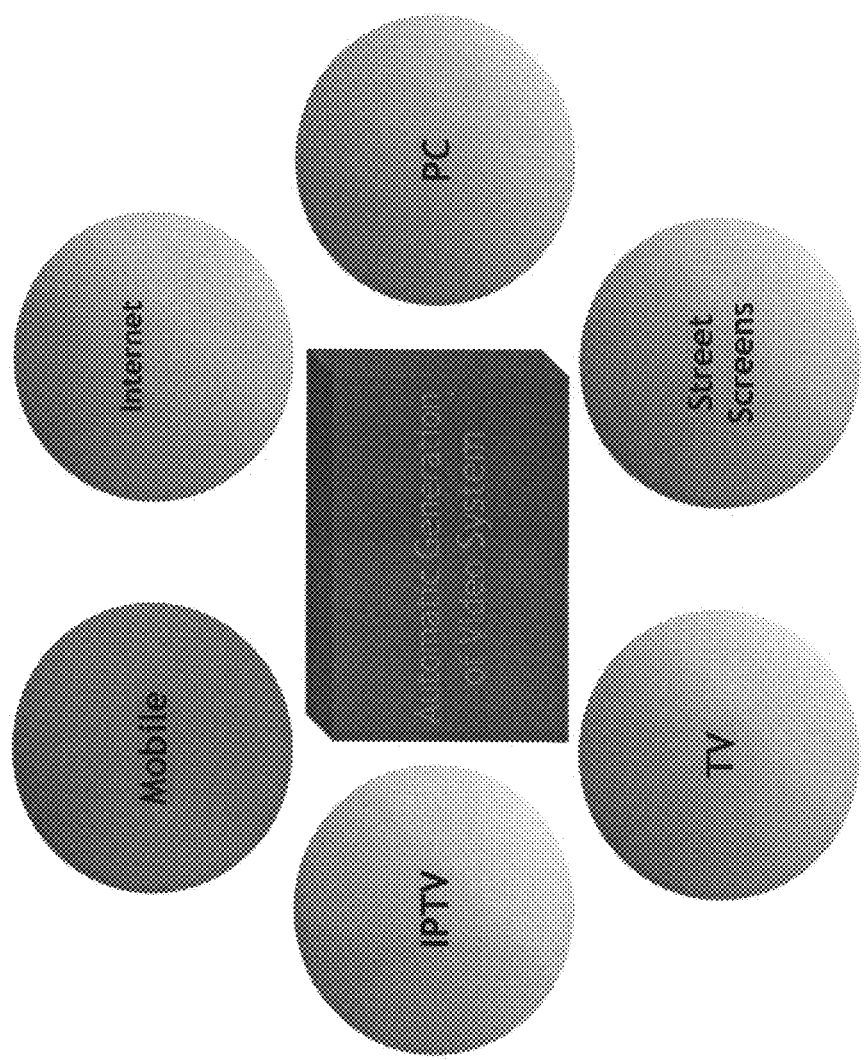

Reference is now made to FIG. 7, which is a balloon diagram illustrating different methods for delivery of the content. The automatically generated video is a standard video file which can be consumed using any standard video consumption device. The video can be output in any standard video format to accord with any standard viewing system. Examples include the following:

Mobile: the video can be delivered to consumers via mobile devices and handsets such as mobile phones and PDAs. This can include Video on Demand streaming video, mobile TV broadcast channels, messages, and more.

TV: the video content can be delivered to consumers via Television sets including standard cable & satellite, IPTV, smart set-top boxes, and more.

PC: the video content can be available for consumers on their PC after being delivered via the Web or any other suitable delivery method Street screens: in many places it is common to place street screens for example at large traffic junctions for drivers to view content while waiting for the green light. This can be yet another medium though which people can consume the generated video.

The above-described method may be applied to any video delivery protocol including: Streaming, Download, Progressive Download, Unicast, Multicast and Broadcast. In addition, the same rules and algorithms can be used to create an audio-only stream instead of a full audio/video stream.

Figure 8:
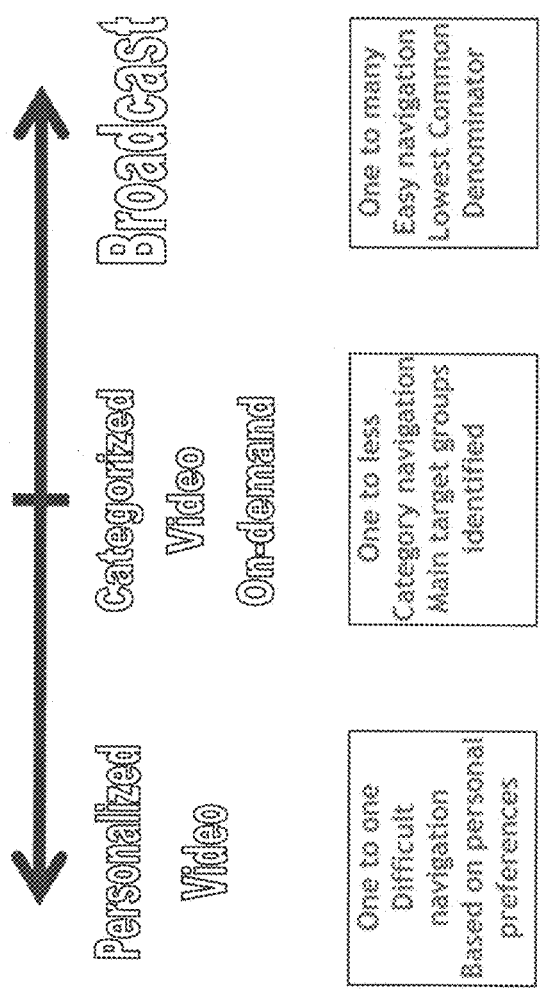

Reference is now made to FIG. 8, which illustrates different distribution paths for video content generated via embodiments of the present invention from structured data held in a flat content databases 100. Video clips made according to the present embodiments fit new media such as the mobile web, and complement the existing web. The system may generate content channels for Mobile TV that may place together small video clips into related sequences, each clip representing an item such as a product for sale, a musician from a musical biography website, a blog, a person from a dating site, and so on, as discussed above. Clips may be limited within a time frame of between 30 and 300 seconds. The viewers may join or leave a generated channel at any point, as they would need to when viewing using a mobile telephone and which is entirely suitable for such a random way of viewing.

Figure 9:
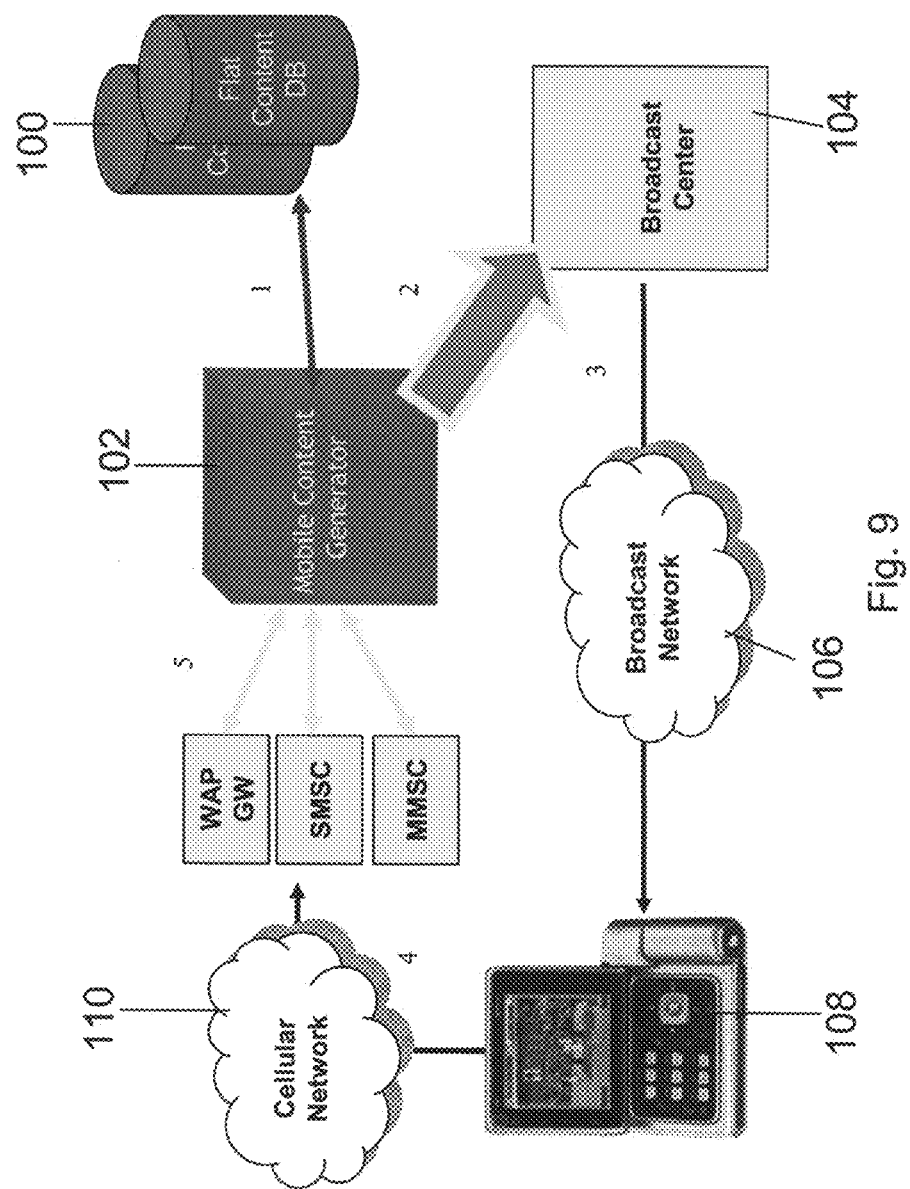

In FIG. 9, a TV content generator system 102 interfaces with external flat content database or repository 100 (e.g. a Web site) in order to obtain the media elements.

After processing the elements and generating a channel or a program the generator system 102 sends the generated TV content to a broadcast center 104.

The broadcast center 104 broadcasts the video using broadcast network 106.

The viewers consume the TV broadcast using their mobile devices 108, and use GPRS or WAP, MMS and SMS, which are delivered through the cellular network 110, for interactions.

The TV content generator system 102 receives the interaction data, analyzes it and uses it to update the current video stream, and/or to generate new programs in the future.

Reference is now made to FIG. 9, which illustrates the different video consumption alternatives, personalized TV or one to one, Group TV or one to a plural subset, and broadcast or one to all.

First of all considering personalized TV in more detail, one aspect of the automatic generation of video is the feasibility of creating personalized video or personalized TV. To date with the level of manual input required such would have been unfeasible.

An example of personalized TV is for a user to enter his/her preferences to a news site and get a personalized video version of the news that fits his or her tastes. For example one would select: one headline, one sports item, two financial items and the weather while another can choose: one 'around the world' item, three science and technology items and the weather forecast. The system receives the viewer preferences, searches the database which includes news pieces and selects items, according to constraints generated from the preferences and then generates automatically a video stream which fits those preferences.

Another example is dating—a viewer can set parameters in which he/her is interested. For example, a male, age 20-30, blond, non-smoker and so on. The system selects from the database of available matching partners those who meet those constraints and may generate a sequence of video clips which fits exactly the preferences of that viewer.

Returning now to FIG. 9, and the present embodiments apply to any of the combinations of the possible delivery and consumption mediums and of the different video consumption alternatives. The applicable alternatives are represented as cells in Table 1 below. Cases of particular interest are numbered and it will be appreciated that certain cases are of less interest.

TABLE 1

Delivery Methods versus Type of Programming

|  | Mobile | Internet | TV | IPTV | PC | Streets Screens |
|---|---|---|---|---|---|---|
| Personalized video | 1 |  |  |  |  |  |
| Video on Demand |  |  |  |  | 3 |  |
| Broadcast/ multicast video |  |  | 2 |  |  |  |

Case 1 represents a scenario in which personalized video is generated according to preferences of a single viewer and is delivered to his mobile handset, via video streaming, download, messaging or any other delivery method.

Case 2 represent a scenario in which video is generated and then broadcast over a broadcast medium and consumed using the TV set. The broadcast medium may be the air—terrestrial, cable TV, satellite, or any other broadcast or multicast method).

Case 3 represents a scenario in which the generated video is consumed on the PC at the specific request of a viewer, that is video on demand.

Any other cell of table 1 is applicable as are other delivery and consumption media, including video consumption alternatives which are not mentioned here. Some cells are likely to be of less interest, thus personalized TV via Street Screens is likely to be a null case.

The generated video can be interactive or non-interactive. Interaction may include participation in polls, rating of items such as songs or people, placing bids in auctions, purchasing products, downloading items, voting and so on. In that way, the viewer not only views the video but also interacts with it. In some cases, the generated video may be affected from the interactions. For example of there is a poll in a news video, the results may be displayed on the screen.

The interactivity technology, the feedback element referred to above, depends on the delivery medium and the available technology on the client side and the standards the client device uses. For example, if the delivery of the video is to a mobile device, the consumer interaction is based on mobile technology and standards such as DVB-H. If the delivery of the video is through a Television set then interactive TV technologies and standards are used, for example the Open TV standard. If the delivery of the video is through the Web to a PC, then interactive Web technologies and standards may be used, such as HTML, and Java script.

The automatic video generation technology generates clips of varying sizes. Different clips may be joined together in random or determined fashion to produce channels. Channels have been discussed above, but the possibilities presented by the channels are now considered in greater detail.

The channels created according to the embodiments of the present invention may vary greatly and include any type of content. Below are some examples for types of content, just to illustrate the potential:

Shopping channel—Such a channel may be based on shopping sites such as ebay.com, and amazon.com. The system may use the different products on the site which are for sale and the content which describes them, including text, images, video and audio, to create a shopping channel which offers those items. The system can include live bids in which those products are offered and allows purchasing of those products while watching.

Dating channel—Such a channel may be based on dating sites such as Match.com, Cupid and others. The video can display the people registered to those dating sites, information about them, their pictures, preferences and more. The video can also include audio sound track which matches the described person, e.g. her/his preferred music, a song which represents that person, for example a romantic song for a person who states that he or she is romantic, and so on.

Blogging—a blog channel may select interesting blogs or podcasts. The channel could be based on sites such as MySpace, Blogger or any other self generated content based sites and displays them. A blog typically includes information about the person, his/her pictures and so on.

News—A similar approach may be used to generate general News feed, financial news, entertainment news and so on. A News piece usually includes a text, some pictures and potentially a video clip. The generated video can have the look and feel of a TV News edition, with virtual narrators, transitions between articles and so on. The system can also aggregate News items to create a rich article. For example if the news story is an update from an ongoing trial, the system can collect News pieces from previous days to provide a preview to the viewer to show what has happened so far in the trial, before updating on the latest news from the trial. Alternatively the preview could be provided as a user requested option for users requiring it, an option which would be skipped by viewers either familiar with the past history or not interested enough to want to find out.

Music—The system may use existing songs database and create either an audio or video channel therefrom. The sources can include music sites such as www.allmusic.com, where information about musicians such as their history, discography and more can be found. The generated video can include information about those musicians, their life and their music, show some pictures of their CD covers, or any other images, play their music in the background and offer related goods to purchase, such as CD's, ring-tones, tickets for concerts, and more.

Education—An education channel may use sites such as Wikipedia, which has factual articles on wide-ranging topics. Programs may be generated from clips on related topics, or random selections of clips may be made based on the different articles. The articles usually include in addition to the text some graphics which can be displayed. The system can choose interesting articles from the database and display them one after the other Movies info—A movie site may use sites such as IMDB or moviefone to display video pieces on different movies one after the other. The clips could include the story of the movie, its history, pictures of the actors or other participants and their biography, and potentially the trailer of the movie. The sound track of the video may use the original sound track of the movie.

Games—a games channel may use sites like Allgames and IGN to show different computer games and information about them, including screen shots.

In addition to the above, the possibilities for channels are limited only by the desire of the viewer to watch and the availability of source material. Possibilities include channels for:

Sports—channels may provide sports updates, stories, including background stories, follow particular events etc.

Travel, a travel channel may show sites to visit, city guides, allow ordering of seats for shows, and so on.

Celebs/Paparazzi. A celeb channel may show paparazzi pictures of celebrities.

Gambling. A gambling channel may use gambling sites to generate video which can be used for gambling.

Test yourself. A test yourself channel may use sites in which the user is asked questions about himself/herself and according to the answers gets results about his/her potential in different fields, or about his health. An interactive trivia channel may allow a viewer to test himself on selected fields of knowledge.

Food. A food channel may use sites which include information about recipes, restaurants, kitchen equipment, and more.

The implementation of a system for automatic generation of playable media, in particular video, is now considered in greater detail.

In order to automatically render video, a rendering system is preferably provided with material that includes all the information needed for rendering. VSML, as used in the preferred embodiments, is a markup language intended to semantically define a video clip to a video rendering application. VSML is object oriented and allows authors to describe video scenes using high-level semantics similar to those used by directors or screen writers. The format is XML based and extendible.

Relationship of VSML to Other Standards

VSML uses the XML document format as the primary format for VSML documents. VSML also makes use of XML Namespaces and XML Schema.

Some of the synchronization and timing constructs in VSML are modeled after SMIL. SMIL or Synchronized Multimedia Integration Language, is a W3C Recommended XML markup language for describing multimedia presentations. It defines markup for timing, layout, animations, visual transitions, and media embedding, among other things. However it does not include functionality for enhancement beyond the bare content that it is presented with.

Some of the things that SMIL is used for are to create slide-show presentations and the SMIL technology has the ability to display multiple file types such as text, video, and audio. SMIL is similar to an HTML like language that is written in XML has options such as including links to other SMIL presentations and buttons such as stop, start and next.

SMIL was developed in 1997 and is a language that makes multimedia presentations stand out. SMIL can display presentations from multiple web servers, and that way display multiple files even from multiple locations.

Many of the synchronization and timing constructs are similar or identical in behavior. However, inherent differences between VSML and SMIL require deviations from the SMIL model in many cases, as will be discussed below.

VSML comprises a modular architecture in which each module defines capabilities and behaviors building on other modules. The basic module is the Timeline Programming Language, or TPL Core. TPL is an object oriented programming language used for scheduling synchronized behaviors on a timeline. The TPL core provides the foundation of VSML, but has nothing to do specifically with video or rendering.

VSML Core is a TPL extension that defines how TPL may create video clips. VSML core includes additional syntactic elements, new classes, and video-specific computation models.

VSML 2DZ is a specific extension which builds on VSML Core and defines a specific VSML environment which is based on a single camera and all rendering is performed effectively in two dimensions, using z-order. It also defines a standard library of objects usable in this environment such as video clips, images, template animations, text, avatars, etc. VSML 2DZ thus supplies much functionality for allowing the video environment to be described.

Time-Oriented Programming

A key concept in TPL, the foundation of VSML, is an element of time. The key goal of TPL, from a programming perspective, is to schedule behaviors along a timeline and compute, from this schedule, the state of the system at any point in this timeline.

Consequently, TPL, and VSML are in many respects a functional language, not a procedural or imperative language. That is to say the computer does not expect the implementation to carry out TPL statements in order and as fast as possible—rather specific expect behaviors are scheduled to occur at specific time intervals with well defined dependencies between them.

Object Oriented Model

TPL and VSML are also object-oriented languages. Everything being manipulated is an object, and the results of those manipulations are also objects. Objects have state, an interface and an implementation.

A TPL document is made of statements that define TPL entities and invoke behavior along the timeline. Some statement, may, in turn, contain other statements. The statements are encoded into a document using a predefined TPL document encoding. The following defines one such encoding, the TPL-XML encoding. TPL-XML encoding currently relies on extensions, such as VSML to provide specific class and method definition statements of their own.

One of the main tasks of any TPL implementation is to understand how the various methods, such as modifiers and actions, invoked on an object in a TPL document determine its state at any given time along the timeline. The model TPL uses to do this is called the Layered Effects Model. Each object has such a model, that determines its entire biography.

We begin by explaining what an effect is.

Effects

The elements of the layered effects model are effects. An effect is the outcome of an invocation of a modifier or action on an object. Examples of effects are:

Making things appear or disappear
Movement
Changing colors
Animations
Playing video or audio clips
Playing background music and sound effects
Graphic effects, audio effects, and transitions
Camera control, zoom, pan, tilt, movement
Changing values of variables in memory
Changing colors
Special rendering behaviors, such as changing some parameter of the renderer
And many more . . . .

Effect Timing

Every effect has timing. The timing of an effect determines when along the timeline of the object various effect-related events occur. In particular, the following events are defined for any effect:

Begin—the time when the effect begins.
Reset—the time when the effect has no more impact on object state
Freeze—the time when the effect function becomes independent of time, as discussed in greater detail below.
The time period between the begin and reset times, including the begin but excluding the reset, is called the effect interval, and its length the effect duration. Similarly, the time period between begin and freeze time is called the active interval, and its length the active duration. The time period between freeze and reset is called the freeze interval, and its length the freeze duration. Note that both the freeze and reset times may be infinite. Note further that all the intervals are half-open—meaning they contain their begin time, but not their end time. The logic of the language requires that the begin time is not later than the freeze time, and that the freeze time is not later than the reset time.

It is noted that the above-mentioned times are associated with an effect without any consideration of the relationship between the current and other effects. The times are properties of the effect itself, not of the whole model. For example, an effect X that sets the color of a certain object to red will probably have a particular begin time, say, 10 seconds into the clip, and a reset time of infinity, because this effect is perpetual in nature, as if to say once I set the color to red, I set the color to red and that is it. This has nothing to do with the fact that if another effect Y sets the color of the object to blue, and starts at a later time, it will override the effect of effect X. How effects are mixed is handled as part of the layered effects model, but is not considered part of each effect's timing.

How the begin, reset and freeze times are determined is discussed later.

Effects are Black Box Functions of Time and State

TPL treats effects as black box functions. A black box function embodies two properties:

Effects are black boxes.
  The layered effects model, in general, is not aware of what an effect means or does. Once created, the model knows how invoke it, how to schedule it, how to prioritize it and resolve conflicts with other effects, and how to obtain its output, but it assumes nothing about what it does. Certain properties of the effect may be exposed to the model, through a generic interface, mainly for purposes of optimization, but the effect remains mainly a black box.

Effects are functions of time and state
  Effects are treated as mathematical functions, rather than as computer program functions. Mathematical functions accept as input the time elapsed since their begin time and the underlying state of the object at that time point, and output the resulting state of the object at that time point. This approach captures both very simple effects and very complex ones. Although many effects may change only a small piece of state, or not depend on time elapsed at all, or not depend on the underlying state at all, the rendering model treats all of them as described. We use the term "effect" as a synonym for "function of time and state to state".

Once again, the function that an effect defines has nothing to do with how it interacts with other effects. The way effects are mixed and prioritized is independent and described in the next section. The effect function must be independent of time during the freeze interval of the effect. Outside its interval, that is before its begin or after its reset, an effect function is not applied. We sometimes say refer to an effect function outside its interval as the identity function.

EXAMPLES

Consider a simple effect that sets the color of an object X to some color C. Its function takes as input the time elapsed, and the underlying state, as if the effect had never been applied, and its output is the same object state, except that the color of the object is changed. The reset time of this effect is infinity, because once invoked it is applicable forever. The freeze time is the same as the begin time, since the effect function is never time dependent.

One may ask: what happens if another effect then changes the object color again? As mentioned previously, this is dealt with in the model—it has to do with how effects override each other, but it does not change anything regarding how each effect itself is defined.

In this previous example, our effect is very simple. The function is not time-dependent. Moreover, it only modifies a small portion of the system state—the color of object X—and if we limit ourselves to this state element, the output of the effect does not depend at all on what that object state was before. That is to say the object color will be C regardless of the system state before. In contrast, an effect saying "dim the color of X by 50%" does depend on the underlying state, and changing it to "dim the object color by 50% over 2 seconds" also makes it time dependent. The ability of the renderer to identify these differences between effects is a part of optimization and dependency detection—but we deal with these issues later. For now, we simply assume all effects are complex.

A more complex effect may be invoking a wave action on an avatar object. The effect function in this case is time dependent, and for each time it defines where the avatar's arm will be and what it will look like. Whether or not the effect on the arm depends on an underlying state really depends on the avatar implementation. Thus a particular avatar may wave differently while walking, for example, or while speaking. Such an effect typically has a freeze time at the end of the wave, and a reset time which may be infinity, say if the waving hand is expected to land in a different state, or the reset time may be the same as the freeze time, say if after the wave the avatar returns to its underlying state.

The Layered Effects Model

The Layered Effects Model is similar to the Sandwich Model of SMIL animations as referred to above, but it is adapted to take into account more complex effects, and effects that are black boxes. The model for a certain object gets, as input, a prioritized list of effects on the object, and generates as output a description of how these effects are combined to determine the state of the object at any point in the timeline. Note that how the list of effects and their priorities are determined is not part of the layered effects model, and we describe this later.

In the layered effects model, borrowing from the sandwich model in SMIL, we imagine a submarine sandwich, where layers of meat and salad are placed on a long piece of bread, each occupying a certain segment, and each laid on top of some other layers. The time dimension of the schedule is laid along the length of the sandwich. The bottom slice of bread can be thought of as the neutral state, with no effect at all, and its length is the entire timeline. Effects are stacked on top of the neutral state, where each effect occupies a segment of the timeline as defined by its begin and reset times. Effects are layered on top of each other in the order in which they are prioritized.

The layered effects model is used to determine the object state at any time in the following manner:
  Given a time point, we view a "vertical slice" of the model or the sandwich at that time point
  We get a well-defined, ordered stack of layers, starting from the neutral state (the bread), and ascending through effects (the meat and salad)
  For each layer, we also know how much time elapsed since its effect begin time
  Starting from the neutral state, we invoke the effect functions in ascending layer order, providing each one, as input, with the time elapsed since it started, and the object state that was the output of the underlying layer.
  The output of the topmost layer is the object state at the time.

The Composite Model Effect

Another way to view the calculation of object state in the layered effects model is to view the entire layered effects model as a single effect. We can say that the various layers in the model, when combined, define a single composite model function for calculating the state of the object at any time in the timeline, based on the state below all layers. If we view every effect function as a function defined over the entire timeline, that is we pad the function out to be the identity function outside the effect interval, we see that this composite model function is simply the mathematical composition of the functions defined by all layers. In other words the output of one layer serves as the input to the next.

Using the composite model formulation, we see that the entire layered effects model defines an effect on the object, that combines the effects of all layers in the model. We call this effect the composite model effect. We note this property of the model because later we will need to combine various layered effects models in a hierarchical fashion.

The freeze time of a composite model effect is the maximal freeze time of all effects in the model. The reset time of a composite model effect is the maximal reset time of all effects in the model.

Compound Effects

The description of the layered effects model so far has been somewhat simplified by focusing on a single object. In reality, a single effect may modify the state of more than one object. Such an effect is occasionally referred to as a compound effect. The effect function of a compound effect is in fact a collection of several effect functions, one per object the effect has an impact on. Such is referred to as the compound effect function. Note that this function also includes components for any objects that the effect creates from scratch. We simply treat an object that has not yet been as if it has a special state called "not created". The "creation" code in fact creates an effect that changes this state to "created" and initializes it.

With the introduction of compound effects, the layered effects model can now deal with more than a single object simultaneously. Each effect scheduled in the model as a result of the invocation of some well-defined block of code, may be compound, affecting multiple objects. To calculate the state of an object at some point in time we proceed exactly as before, taking into account only the components of effect functions that affect the current object.

Execution Frames

The Execution Frame Hierarchy

When a code block or method is executed, TPL creates a new execution frame under which the code block executes. The execution frame contains:
  A reference to the parent frame which is associated with the code block execution that invoked the frame.
  A reference to the context object of the execution, the self.
  A new dynamic local scope for the code block execution to use. The dynamic local scope is initialized with self, and any input arguments the code block received, thus if it is to be the top code block of a method. The dynamic local scope also contains a reference to the static local scope of the code block.
  A new invocation local scope for the code block execution to use. The invocation local scope initialization is described later.

The set of execution frames at any given time forms a tree, with the root execution frame corresponding to the top-level code block. It is observed that in a traditional, single-threaded programming language, the set of execution frames actually forms a single path, or in fact, a stack. In TPL, however, we allow multiple code blocks to be executed simultaneously in the timeline, resulting in a more complex structure. A single code block may be executed several times, and even simultaneously. Each such execution has a separate execution frame. As code blocks are invoked, leaves are added to the execution tree, and as they complete execution, leaves are pruned.

The Layered Effects Model Hierarchy

In this version of TPL, every execution of a code block has its own layered effects model. In a certain sense this limits the range of possible results, given the way various effects are mixed. To overcome the limitation however it is possible to allow some blocks to be considered part of the same layered effects model as their parent frame, allowing for finer control over how effects affect each other.

In general, TPL creates a new execution frame which it associates with a new layered effect model. The layered effects model of execution frame E1 of code block B1 contains a possibly compound effect for every invocation statement in B1 that gets invoked during E1, and potentially additional effects for "implicit invocations" that the code may contain. We describe below how the code is mapped to this layered effects model.

The layered effects model associated with E1 defines a composite model effect, itself possibly compound, for the entire frame. If E1 was invoked from within execution frame E2—of code block B2, say, for example, using a particular invocation statement, then the layered effects model for E2 contains an effect that is the composite model effect of E1.

The above creates a hierarchy of layered effects models that reflects the hierarchy of execution frames. At the top of the hierarchy is the layered effects model for the main code block of the program. Some effects in this model may be primitive effects, associated with primitive invocations. Others, however, may be the composite effects of code blocks invoked from the main block, such as methods called by the main block. These, in turn, may also contain primitive effects and effects of code blocks invoked from them.

For example, if the main code block contains three invocation statements, one for some built-in method M1, one for an inline code block B, and one for method M2 that is coded in TPL, then the top-level layered effects model contains three effects, one for each invocation. The effect for M1 is provided by the built-in method implementations. The effect for the invocation of B is the composite model effect for the layered effects model associated with the execution frame of B, created under the top level execution frame. This may, in turn, contain other effects, which may also be results of other layered effects models. The effect for the invocation of M2 is, like the one for B, a composite model effect for the layered effects model of the execution frame of the invocation of M2 under the main execution frame.

Execution Frame Accessors

An execution frame allows code to access information regarding the frame via accessors. In most cases, these accessors define events that take place during the execution frame. The following accessors have standard meanings:
  begin, freeze, reset—must be identical to the begin time, freeze time and reset time of the composite model effect of the execution frame, respectively
  end—the semantic end time of the execution frame. This is usually equal to either the freeze or the reset events, but not necessarily. It indicates the conceptual end of the frame, as opposed to the "technical" freeze or reset times.

Methods and code blocks may define additional custom accessors. When a frame is associated with a TPL code block (as opposed to a built-in method), the freeze accessor is calculated automatically, and the end and reset accessor are calculated based on the endSync and resetSync attributes of the block, as described in greater detail hereinbelow. Additionally, any invocation statement ID defined for some invocation statement in a code block, also defined an event accessor of the same name for any execution frame of that code block. This accessor returns the Invocation object associated with the ID in the invocation local scope of the frame as discussed below.

The Time Graph

Now that we know how various effects are combined to determine object state, and how effects in an execution frame are combined to create the effect of the entire frame in its parent, it is now required to describe how the effects are actually created from the code, and how they are prioritized. This is accomplished by a model called the time graph.

Every execution frame in TPL is associated with its own time graph. The time graph is a directed graph whose vertices represent pieces of information that appear in the code block, and whose edges represent dependencies between pieces of information. More formally, an edge (v,u) exists (from v to u) if and only if knowledge of v is required to compute u. The following sections describe how the time graph is constructed and used.

The nodes of the time graph are Invocation objects, and we begin by describing what invocation objects are.

Invocation Objects

Invocation objects, generally speaking, represent an invocation statement in some code block, within a specific execution frame. They store all information on the invocation statement, including:
  The expression defining the method to invoke
  The expressions defining its input parameters
  The expressions in the synchronization attributes of the statement
Additionally, the Invocation object stores the execution frame of the invoked code, once we know how to construct it. The Invocation object is used to provide access to events inside this frame. If st_a is an Invocation object associated with invocation statement A, then st_a.ev is an accessor that is passed through to the execution frame of A, and applies some additional manipulations to the result, as will be described in greater detail below.

Initially, when an Invocation object is created, it is completely unresolved, meaning that it knows the expressions that define it, but not their values. The execution frame in the Invocation object is also unresolved. During a process to be described shortly, these fields slowly become resolved. Every Invocation object tracks the resolution status of all its fields. Whenever the Invocation object is queried for an event, using an expression, its ability to return a resolved value for that event depends on the resolution status of certain fields. If it cannot return a resolved value, it returns the special value "unresolved".

We say that the Invocation object itself is fully resolved once all of its fields are resolved. When this happens, we know that the following information is fully determined:
  The execution frame of the invocation, including:
    a) The value of any accessor on this frame
    b) The effect of the frame
  The value of any accessor on the invocation.
  The effect of the entire invocation.

Note that there is a difference between the value of accessors on the frame and on the invocation. The invocation accessors rely on the frame accessors, but they also manipulate their results using additional information. Specifically, the Invocation object clips any accessor from the frame to lie between the begin and reset attributes of the invocation statement. The same is true for the effect of the frame. The effect of the invocation is identical but clipped to the desired effect interval.

As an alternative the clipping functionality may be made part of the frame, and not of the invocation object.

When the Invocation object is partially resolved, that is certain fields are resolved while others are not, some or all of the above information may be determined. In this circumstance we define the following two rules:
  When the begin attribute of the Invocation object becomes resolved, then the begin event of the object becomes resolved and has the same value.
  Other events and the effect become resolved only when the Invocation object is fully resolved. More precisely, the invocation can answer queries regarding event accessors once its code has been determined, which happens when the begin time has been resolved. Whether or not it answers a resolved value to such a query depends on how many of its arguments have already been resolved, and its code. This allows us to specify dependencies that appear cyclical between invocations, but are in fact resolvable if the invocation is taken apart piece by piece as suggested.

Initializing the Time Graph

Whenever a code block is executed, TPL initializes the time graph for the frame based on the parsed code only. That is to say the time graph initialization is identical for all executions of the code block. The nodes are Invocation objects associated with the invocation statements in the block, and the edges represent resolution dependencies between the statements. There is also an additional Invocation object representing the entire block. Each edge is directed from the dependant node to the node it depends upon. Every edge carries two tags, one indicating how the information should be used in the dependant Invocation, the other indicating which information is required from the Invocation we depend upon. For the first set of tags we currently support BEGIN, END, RESET. For the second set, we support any symbol sequence that can be given as an event to an Invocation. Examples (edge from Invocation A to Invocation B):
  An edge tagged (BEGIN, end) indicates that the end event of B is used to determine the begin of A. Note that how this is used is stored in A (for example, B.end+5).
  An edge tagged (RESET, part2.sequence1.end) indicates that the reset of event A depends on the event B.part2.sequence1.end.

Note that it is possible to define more complex dependencies. In such cases the graph edge may need to carry additional information, and nodes may be required for all intermediate nodes in any expression parse tree used.

The time graph is initialized as below. Note that this entire process may take place in parse time, but a separate copy of the block code is needed for each execution of the block:
  We first verify that all invocation statement IDs in the code block are indeed unique.
  Any invocation statement that does not have an ID is given an internal automatically generated ID. The automatically generated ID is one that cannot be confused with any ID the programmer can use.

The entire block is assigned the ID of the block.
Every synchronization attribute given as a number n, for the entire block or any invocation statement in the block, is replaced by block.begin+n.
Based on the defaultTiming attribute of the block, and the defaultBlockSync attributes of invocation statements, we add a begin attribute to any invocation statements that does not already have one, as follows:
  a) If defaultTiming of the block is seq, then begin is set to be lastid.end, where lastid is the id assigned to the latest invocation statement in the block (in document order) that appears before our statement, and has next in its defaultBlockSync attribute.
  b) If no such statement exists, or if defaultTiming of the block is par, then we set begin=block.begin.
We create an Invocation object for every invocation statement in the block. It is initially fully unresolved.
We create an additional Invocation object for the entire block, that stores the expressions used for the endSync and resetSync attributes. This is a special Invocation object that does not refer to any execution frame, it simply stores the values of the begin, end, freeze and reset times of the block as calculated during the resolution process. Initially it is fully unresolved.
All Invocation objects are added as nodes to the time graph.
For every invocation statement A, we parse the expression in the begin attribute. At this stage all invocation statements have such an attribute of the form <base>+<offset>. <base> must have the form <id>.<event> (where <event> may also include access operators). If <id> is not a valid invocation statement id in the code block, taking into account the automatically generated IDs and the block ID, then an error is produced. Otherwise, a BEGIN edge is added from the Invocation object of A to the Invocation object of <id>, and the event query of the edge is set to be the <event> expression.
We perform a similar process for the reset attribute of every invocation statement that has a reset attribute. The process involves adding a RESET edge instead of BEGIN.
For the Invocation object of the entire block, we perform a similar process for endSync, as follows:
  a) If the <id> of the expression in this attribute is not first or last, then we add an edge as before, but an END edge this time.
  b) Otherwise, we add an END edge from the Invocation object of the entire block to the Invocation object of any invocation statement in the block that has defaultBlockSync including end. The event query of each such END edge is set to "end".
We do a similar process for resetSync, using RESET edges, and using the event query "reset" instead of "end" when required.
Note that it is legal for the time graph to have very specific types of cycles—for example, we allow the begin of Invocation A to depend on the begin of Invocation B, while the reset of B depends on the reset of A. This is allowed because we do not need the reset of B to determine the begin of A. An alternative would be to design the time graph with more nodes—a node per expression and intermediate expression, and a node per "Invocation field" or group of fields that determine some value. The graph also contains an implicit dependency, within each node, between the entire node and the begin attribute of the node. An alternative is to split each node in two. The use of such an alternative provides for consistent use of graph theory terminology.
Finally, the invocation local scope of the execution frame is initialized so that the invocation statement IDs entered by the programmer, but not those generated automatically, refer to the Invocation objects created. The name block refers to the Invocation object of the entire block.

Resolving the Time Graph

Once the time graph has been initialized, the TPL attempts to resolve the time graph and construct the layered effects model for the execution frame, simultaneously. When the execution frame of the code is created, we get as input the underlying biography of all relevant objects, before the current execution frame has had a chance to apply any layers, and a begin time of the execution frame along the timeline.
The first thing we do is to set the begin time of the Invocation object associated with the entire block to the begin time we have as input for the execution frame. We also resolve any fields in any Invocation object that do not depend on anything. Since most expressions are constant expressions and accessors are immutable in the current embodiment, it is almost always possible to calculate the value of any non-synchronization expression during parse time and retain the result.
We now proceed with the following iterative process. Whenever an Invocation becomes fully resolved, we add its effect to the layered effects model of this execution frame, using the proper begin time. The priority of effects added this way is by the order of addition to the model.
  We propagate information through dependencies as far as possible, using the time graph alone, i.e., without creating any new execution frames in previously unresolved Invocations. We use the following rules:
    a) For the block Invocation, the end event accessor can be calculated once all its dependencies are known. The calculation is based on the endSync expression, as described hereinbelow. The same is true for the reset event accessor and resetSync.
    b) For any other Invocation:
      The begin event accessor can be calculated once the begin attribute of the Invocation is resolved, and it has the same value.
      Any other event accessor can be calculated only once the invoked code is resolved. Once the begin time is known, the invocation code is known, and the invocation can now answer queries regarding event accessors. Note that some of these queries may have a resolved response even before the entire invocation and all its arguments have been resolved. For example, an invocation may be able to report the location of some internal events before it has determined it's its reset time. The reset time which may depend on the yet unresolved value of the "reset" attribute.
  If all nodes are fully resolved, including their underlying execution frame, then the process is complete.
  We now search for all nodes that are fully resolved except for their execution frame. Among these, we search for the set of nodes that have the earliest resolved begin time. Among all of those, we select the set of nodes whose begin time does not depend (directly or indirectly) on the begin time of any other node in the set. Among these, we select the node whose invocation statement appears first in document order.
  If no such node exists, there is an error, a cyclic dependency.
  We now have an Invocation object with a known begin time. We resolve this Invocation fully using the following process:

a) We evaluate the expression defining which method or code block to invoke, and the expressions defining the input parameters. We perform this evaluation at the begin time of the Invocation, using the state of the relevant objects, as defined by the layered effects model we have constructed so far and the underlying state that was provided prior to the current execution frame having been started.

b) We create an execution frame for this code block with these parameters, provide it with its begin time and the underlying biography of all objects, and ask it to construct its own layered effects model and event accessors.

We have now created a new execution frame and composite model effect. We store this frame in the Invocation object, and add the composite model effect to our layered effects model, with the next priority.

We now have newly resolved accessors on this Invocation object. We repeat this process.

The process ends when either an error is detected or when all Invocation objects have been fully resolved. At this point, the layered effects model is complete and our execution frame can generate its composite model effect, and knows the values of all accessors thereon.

Note that if an invocation becomes resolved with a begin time prior to a begin time of a certain invocation that has already been added to the layered effects model, then it the invocation with the prior begin time is added using a higher layer. Therefore, it cannot affect the resolution of the already resolved invocations.

Top-Down View

When a TPL program is executed, the implementation creates the root execution frame for the main code block, with begin time 0, and an underlying machine state (state of all objects) that is empty, except for objects defined in the execution frame itself (the local scope, etc). The execution then resolves the time graph of the main code block, constructing its layered effects model, using the process described hereinabove. During this process, it will occasionally create an execution frame for some other code block or method, and recursively invoke the resolution and construction process on that frame. The primitive frames, associated with built-in methods, create their layered effects model without recursion.

Eventually, the implementation will have a fully resolved time graph and layered effects model for the entire program. It will be appreciated that certain effects in the model are in fact composite model effects of their own layered effects models, etc. The TPL can then calculate the state of any object at any time in the timeline, which is the goal of TPL execution.

The following describes how a VSML description of playable media may be rendered into an actual clip of playable media. We first define the key entities involved in generating a VSML rendition, and then discuss how they interact.

Universe, Snapshot & Rendition

A Universe is a multi-dimensional space that may host matter at any point therein. A Point in the Universe is a member of the multi-dimensional space, identifiable by a vector of coordinate values, one per dimension. Every Universe defines a system of axes and metrics used to specify spatial and matter values in the Universe. Such a system is called the Universe System. The universal system used in the present embodiments contains measurement systems for:

Spatial values—the system is a 3D Euclidian geometric space and measurements use an orthogonal Cartesian coordinate system. We call the three axes x, y and z.

Matter properties—the most basic properties of a point in space and time, and their associated natural measurement systems:
a) Color (24-bit RGB)
b) Transparency
c) Emanating audio
d) Mixing properties—properties that affect how two matter specifications for the same point in space and time are mixed to generate one matter specification. Currently, there are no mixing properties (mixing is predefined and requires no additional information).

Higher-level measurement systems as required (for example, font size).

In theory, different Universes may use different systems, and some universes may be radically different from others. Examples of radically different systems may be 2D spaces, non-Euclidian spaces such as the 2D surface of a Sphere, or systems that allow specifying matter lighting responses, light source properties, or more complex mixing properties such as priorities, etc. In the present embodiment we use the Universe System as described above. When we use the term "matter", we are effectively referring to an assignment of values to each of the matter properties defined in the Universe System. A point in the Universe may also have no matter, in which case we say that its matter is a vacuum.

A Universe Snapshot at a specific point in time is a mapping of each point in the Universe to the matter occupying that point at that time. A Universe Rendition is the history of all Universe Snapshots over all points in time. Formally, the rendition is a function from a point in time to its Universe Snapshot. We use the terms rendition and snapshot interchangeably, where the latter is used when we wish to specifically speak about a certain point in time.

Most Universe Renditions only affect a certain sub-region of the Universe space called the Universe Rendition Region, and all points outside of the rendition region are a vacuum.

Real Objects

Real objects are objects that have a certain position in some Universe. Examples of real objects may be:
Media clips
Images
Avatars
Text
Sound sources
Cameras
Lights
Microphones
Groups of real objects
Shapes & Regions
The entire Universe Many real objects occupy space in the Universe, but some do not. Note that a real object does not have to be visible in the Universe. A region for example may occupy space, but would not actually be visible. Roughly speaking, real objects correspond to real-world objects that have physical existence. We occasionally refer to objects that are not real as non-real objects. Non-real objects have no direct impact on rendering. They are used primarily as tools in the generation and control over other objects and effects, but they are not rendered. They are, however, manipulated by the TPL execution model, as described hereinbelow. All real object classes derive from the base class RealObjectBase in the VSML Core namespace.

Real Object Universe & Transforms

Every real object has its own internal Universe, which is referred to as the Real Object Universe. The internal universe in turn has its own Universe System, referred to hereinbelow as the Real Object System. In some embodiments the real object system may be constrained to have the same properties as the containing universe but this does not have to be the case. The Real Object Universe contains all matter belonging to the real object at any point in space and time, and is a vacuum at any other point. The mapping between the Real Object Universe and the Universe containing the real object is done using a sequence of transforms. In the present embodiments we define the following transforms, applied in the order they are presented, but additional transforms may be readily added:

Scale transform—defines a scaling factor for every spatial dimension in the Universe system.

Translation transform—defines an additive shift for every spatial dimension in the Universe system—that is to say the transform defines the position of the origin of the real object's spatial coordinate system in the containing universe system.

Volume transform—defines a relative volume gain to apply to all emanating audio from the object.

The transform information may be but is not necessarily part of the state of the real object. The universe, system and transforms of any real object are completely independent from those of any other real object.

Real Object Snapshot, Rendition & Bounding Region

The Snapshot of a real object at a specific point in time is a mapping of each point in the Universe to a matter specification of the matter of the real object occupying that point. The Rendition of a real object is the collection of its Snapshots for all points in time, or formally, a function from a point in time to its Snapshot. Note that interpretation of terms such as rendition depends on whether one is referring to the Real Object Universe or the containing Universe. In the following the snapshot or rendition in the real object universe is referred to as the pre-transform snapshot or rendition, and that of the real object in the containing universe is referred to as the post-transform snapshot or rendition.

Every real object provides access to a bounding region, which may be infinite. At any point in time, any point in the Universe not in this bounding region must be a vacuum point in the real object snapshot. Some real objects, such as the camera or regions, have snapshots that are all a vacuum. Such objects are called vacuum objects, but are not to be confused with non-real objects. The term "providing access" is used since we do not provide a true accessor, usable in VSML code, for the bounding region in the present embodiment. We do expect the implementation to gain access to the bounding region, however.

Real Object Methods

A real object may have methods like any other OOP object. When accepting input parameters or returning return values, the real object implementation takes into account the transforms in effect, and makes sure to translate between values in the containing Universe System and the Real Object System.

The base class RealObjectBase provides basic automatic translation facilities when the meaning of method input parameters and return values is clearly understood from their class or state. In many cases however, proper translation of a value is not well defined. Thus may occur for example, when an input parameter is a number denoting some length, but the scale transform is not uniform in all dimensions. In this case the implementation must issue a warning that translation is not possible and the result is not well defined.

In other cases translation may be well defined but is only possibly by the specific method being invoked. In this case the method implementation may override automatic translation by the base class and perform custom translation itself.

Real Object Containers

A real object container is a special real object that contains other real objects. All real object container classes derive from the class RealObjectContainerBase in the VSML Core namespace. Every such object includes a collection of other real objects, and generates its snapshots and rendition based on this collection. When real object A is contained in real object container C, we also say that A is a (real) sub-object of C.

Adding & Removing Real Objects

A real object container defines methods to add and remove real objects from its collection. These methods are actions named add and remove, and they are always immediate (i.e., end=begin). Their freeze time is also identical to their end time, and their reset time is always infinity. Both of them accept a single parameter that is a reference to the real object to add or remove.

Constraints on Containment

Finally, the containment relation must define a simple, directed acyclic graph between real objects at any point in time. This means that:

A real object may be contained at most once in at most one container at any given point in time. Adding real object R to container A while it is still contained in container B implies the removal of R from B. Likewise, adding R to A when it is already contained in A does not change the collection—R is still contained once.

When a real object is added to a container, if a cycle is created, an error must be reported.

Note that the aforementioned graph defining the containment relationships need not be weakly or strongly connected.

The Stage

Real object containers define, upon construction, a special box or more exactly a rectangular prism in their Universe called the stage. The stage has no impact on rendering, but it may be used for relative positioning or sizing of real objects in the container.

In the present embodiment, the stage of any real object container is always initialized to a rectangle in the positive quadrant of the x-y plane, that is all its points have $x \geq 0$, $y \geq 0$, $z=0$, so that it has one corner at the origin (0,0,0), and its width (length on the x dimension) and height (length on the y dimension) are defined to be the width and height of the target video, in pixels. The stage cannot be modified (in construction or later). It is further possible to address how objects get informed of the aspect ratio, resolution and pixel size of their target drawing area, especially given multiple cameras, split screen scenarios, layouts that are chosen differently based on these parameters, and 3D vs. 2D issues.

Container Rendition & Bounding Region

A real object container generates its rendition by combining the renditions of its real sub-objects. We define the container rendition by specifying its snapshot at every time. The snapshot S of the container at time t is the result of the following process:

Collect the snapshots for time t for all real sub-objects in the container at time into a list L.

Sort L according to the order in which the objects were created.

For any point p in the container's universe:
   a) Extract from each snapshot in L the matter specification for p, generating a list M of the same length and order as L.
   b) Apply the mixing function to M. The mixing function does the following:
      The color and transparency values are mixed using standard alpha blending, in the order of the list.
      The emanating audio is mixed using standard addition of audio samples.

The above application of mixing is quite arbitrary. It may be desirable to allow more complex mixing scenarios. Note that mixing only occurs between matter occupying the same point in space and time. In particular, it does not apply to objects that are behind each other in a 3D space—the effect of hiding or transparency in that case is a result of the camera viewing model which is dealt with elsewhere herein, and not part of the Universe Snapshot.

c) The output of the mixing function is the matter for p in the snapshot S.

The bounding region of the container is defined as the union of the bounding regions of its sub-objects.

Location Objects

A location object is a special kind of real object container that is equivalent to a real-world film shooting set. In addition to the usual properties of real object containers it may define sensors such as cameras and microphones and output feeds. Moreover, a location cannot be a sub-object of any real object container.

A location object is an instance of a location class. Location classes typically derive from location base classes that define their capabilities and behavior. In this version, we define a single location base class called Location2DZSingleCamera from the VSML 2DZ namespace, which defines a location with a single camera, single microphone, and single output feed that are all fixed and emulate a 2-dimensional setting with z-ordering and alpha blending.

In the present embodiment, location class constructors accept no parameters.

Sensors

In order to generate a video it is not enough to know the location rendition, we also need to translate this information into visual and aural signals. This is done by special vacuum real objects called sensors. We define two types of sensors, the camera and microphone.

Each location object is preferably provided with one or more cameras and one or more microphones.

The Camera

The camera is a virtual sensor that interacts with the Location Snapshot at any time by capturing the visual properties of the matter in the snapshot and translating it into a raster image. At any given time, the camera has a position and orientation in the Location object's Universe, and views a certain region of that universe called the camera's viewport. The viewport's shape is determined by the camera's position and orientation, as well as its aspect ratio and horizontal viewing angle. In the general case the viewport is an infinite rectangular-base pyramid with the tip at the camera, and appropriate orientation and angles. When the camera has a horizontal viewing angle of 0, the viewport is a rectangular prism and it is defined by an additional parameter, the frame width, which is the width of the rectangular cut of this prism, perpendicular to the direction the camera is pointed at. The rectangular cut of the camera's viewport at a specified distance from the camera in its viewing direction is called the viewport frame at that distance. If the horizontal viewing angle is zero, the viewport frame is not dependent on the distance from the camera.

In some versions, for simplicity, the position, orientation and viewport of the camera are completely fixed and cannot be modified. However in general these parameters are fully modifiable. In the simplified version:
   The camera's horizontal axis is parallel to the Universe Space's x-axis
   The camera's vertical axis is parallel to the Universe Space's y-axis
   The camera is directed in the negative direction of the Universe Space's z-axis.
   The camera is positioned at point $(x, y, \infty)$, where x and y are selected so that it is pointed directly at the center of the location's stage when the location is created.
   The camera's horizontal viewing angle is 0, and its aspect ratio and frame width are defined so that the viewport frame is exactly the location stage. This implies that the viewport has the same aspect ratio as the target video feed.

An assumption may be made that all other objects do not have any coordinate that is infinity. Placing the camera at a z-coordinate of positive infinity pointing in the negative z direction has the effect of making all objects seem flat, and with zero z-distance between them. In other words, the effect is similar to having a 2D space with a z-order instead of true depth.

Theoretically, the camera translates the location snapshot to a raster image by tracing rays of non-diminishing light emanating from the matter in the snapshot towards the camera, parallel to the z-axis. Taking into account color and transparency, the result is specific light arriving at the camera at every point in the viewport frame. The camera outputs an image with the same aspect ratio as the viewport, where each point in the image has the color of the corresponding light point in the viewport. Collecting all images for all points in time produces a video feed.

In the case of the simplified version above the image collection is equivalent to simple z-order alpha-blending. That is to say image collection comprises the following:
   For each point in the image, find the corresponding point in the viewport frame
   For each point (x,y) in the viewport frame, list in order of increasing z-coordinate the non-vacuum matter in the location snapshot.
   Perform standard alpha blending on the color and transparency values in this list, in the order specified, yielding the color of the point in the image.

The final stage in the rendition process comprises translating the image into a specific array of pixels. The translation comprises dividing the image into pixels, and averaging the color values of all points in the pixel to a single color value for the pixel. The camera may also apply anti-aliasing to the resulting image if necessary.

The Microphone

The microphone captures aural properties of the matter in the location snapshot at any time and translates it into an audio sample. In the simplified version the microphone simply collects all audio in the snapshot and mixes it at identical gain levels. The simplified microphone does not take into account at all the positions of the matter that from which the audio emanates. As a result, the microphone is a very degenerate real object—in the sense that its spatial and matter properties are of no importance. In more sophisticated versions sound may attenuate with distance and two microphones may be provided to obtain directional effects. For the three-dimensional case, where the camera is made to move around the stage, lighting, material and 3D effects in general may be addressed using the universe system.

Output Feeds

Every location object may define output feeds and control them. In the simplified version, the system is constrained so that every location has exactly one output feed which combines the visual output of the single camera in the location and the aural output of the single microphone in the location.

The Clip Object

A VSML document defines a top level class called the clip class and at least a default action for this class. The clip class is usually a subclass of a certain base class that defines its general capabilities and behaviors, and this base class usually derives from a certain location class. In a current version a single such base class is called Clip2DZSingleCamera in the VSML 2DZ namespace, that derives from the class Location2DZSingleCamera in the VSML 2DZ namespace.

As a location Clip2DZSingleCamera behaves exactly like Location2DZSingleCamera. The clip class adds a default VideoScreen object that occupies the entire stage of the clip object. The VideoScreen object is used to display output feeds from a location object of choice. The VideoScreen object is a real object that has a flat rectangular shape, and its rendition is an output feed of the location chosen to be displayed in it.

It is pointed out that the location objects are not real sub-objects of the clip object. They are not contained in its universe. It is the VideoScreen that is the real sub-object of the clip object, and its snapshot at any time is the output feed of the selected location at that time.

Note that apart from the VideoScreen object, the clip object may contain additional objects, just like any other location. However, in this version, a VideoScreen object can only be manipulated usefully in a clip object, since the show statement, that controls what it displays, currently assumes there is only one default screen. The location classes a clip uses are typically nested classes in the clip class.

The default action of the clip object is the top-level script of the video clip. In this version the constructor of the clip class accepts no parameters.

The Clip Generation Model

The clip generated from a VSML document is the one generated by the following conceptual process:

Parse the VSML document, creating a clip class (and any other definitions)

Create a code block that contains a command to instantiate the clip class and invoke the default action of the created clip object.

Apply the TPL Execution Model as explained above to the current code block, obtaining, at least conceptually, the state of the clip object and all referenced objects in any point in time.

Generate the clip rendition using the processes previously described. Firstly this involves the rendition of all locations as real object containers in a hierarchical manner. Then it is necessary to carry out rendition of the clip object based on the renditions of the locations and the clip object's own biography. The latter may include the location selected for the VideoScreen at any time.

Example of an Automatically Generated Video

The following is an example which illustrates the potential use of an automated playable media generation system according to the presently described embodiments. In the following example, a shopping video is generated from content on a particular page at the well-known web-site eBay. eBay is a popular Web site which mediates between private sellers who wish to sell their private goods, and buyers who wish to purchase different items. Each page in eBay represents a product to be sold. Such a page can be translated to around a minute and a half of video which displays the product. In addition, the eBay site offers auctions in which buyers can place bids.

FIG. 10 illustrates an example of a typical eBay page. In this specific page a Football is sold. This ball is signed by the players who won super bowl XL. The original page is the following:

The media elements on the page illustrated in FIG. 10 are the following:

Text 110 which describes the product in detail.

Headline text 112 which describes the product

Main picture 114 of the product

Additional pictures 116 of the same product from different angles

Additional pictures of related material 118. Herein are shown photographs of some of the players whose names are signed on the football.

An ongoing bid 120.

A system for automatic generation of playable media could generate numerous alternative audio or video clips from the media elements provided. Below is an example of one such video:

The video is constructed of several scenes. An editor working with the eBay website may define the following scenes using the authoring tool.

Scenes of the Clip:

Introduction

Description of the product

First part of the bid

Intermission in the bid

Second part of the bid

Bid summary and wrap up

Scene 1: Introduction

In the introduction scene the video starts with a narration, preferably generated using a text to speech engine. The narration invites the viewers to watch the next bid which is for a sports collectable. The graphics displays the channel logo (eBay) and some key text elements are displayed on the screen with some interesting transitions. The text itself is not fully taken from the specific web page, but rather includes some additional elements general to the eBay site or to the category of product, to enrich the experience. Thus for a collectable type of an item in the sports field an announcer might refer to an item essential to any serious collection of sports memorabilia.

The audio track may include rhythmical music and a narration of the opening text. A typical opening text may be the following:

"Looking for a special sports collectable? You would sure want to stay with us for our next bid. <Greg Winters> is selling us no other than a <Super Bowl XL Steelers Team Autograph Football>. Tell us all about it <Greg>."

The phrases in the angle brackets represent text that is relevant for the specific item and that is taken from the Web page. Greg Winters is the name of the seller. The rest of the text (bold) is added by the system to enrich the experience. The system can have a database of relevant phrases that it can use to choose from. The database text preferably includes placeholders that can be filled with the relevant text from the site.

Figure 11:
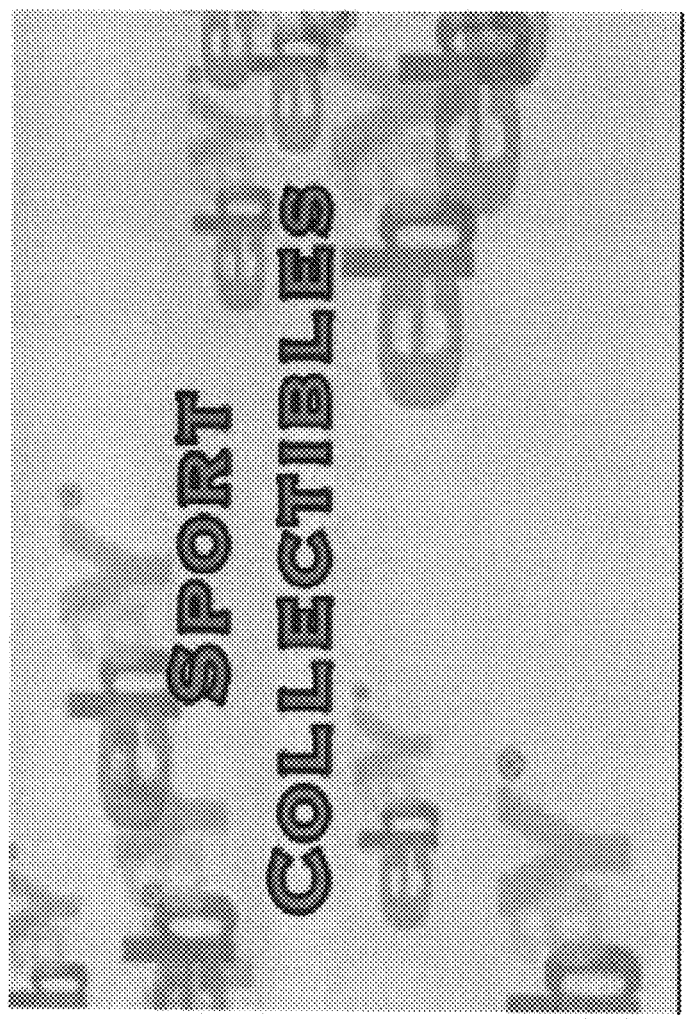

FIG. 11 shows a graphics screen that may be used at some stage in the introduction scene to indicate the category of the product. Such a graphics screen could be built up from the web page itself, since the eBay structure requires strict categorizing of the product for sale.

Scene 2: Description of the Product

Scene 2 includes a description of the product. The narration continues with the music in the background. The text may be narrated by a new narrator, that is a different avatar, or even just a different voice than the first, the avatar does not have to appear. There is a graphical transition between the two scenes with the eBay logo. The following text is narrated:

"<The Pittsburgh Steelers have won Super Bowl forty. Commemorate the historical moment with this unique ball signed by more than 20 steelers!>. For true fans!!!"

Once again the text in the angle brackets represents text taken from the site, in this case the description of the product as set by the seller. The bold text is once again an addition of the system to enrich the experience and can be taken from a database of phrases which are relevant for sports related products. Alternative relevant phrases could be "for sports lovers", "for Steelers supporters" and more.

The graphics displays the pictures which the seller has added to the site. Thus pictures 116 and 118, the minor pictures may be displayed. Preferably a suitable graphical transition is used to make the picture view experience more interesting.

Reference is made to FIG. 11, which shows how the last picture displayed in this scene is displayed with superimposed text. The last picture is the main picture 114 of the product as provided by the seller. The last sentence of the text ("for true fans") is displayed at 120 using a text transition superimposed on the image.

Scene 3: First Part of the Bid

The transition to scene 3 is once again carried out using a graphical transition with the eBay logo as the main graphical element. In this scene the music continues. The bid is managed by a virtual narrator who is displayed as an avatar and the picture of the ball for sale is viewed behind the avatar. The viewers can now place a bid (using their interactive mobile handset or their PC etc) and the text of the narrator is generated automatically according to the viewer's interactions. The text can be the following:

"And the bid starts NOW at <255> dollars . . . . Click the right menu to increase the bid! Our first bidder is Owen from Tucson Ariz.! Owen opens the bid with 270 dollars. Do we here a second bid?"

There are 3 types of text in the above paragraph:
1. The text in the angle brackets (225 in this case) is taken from the site. This is the initial price as set by the seller.
2. The bold text is predefined by the system. Here too the system can use a database of similar phrases from which it can choose.
3. The Italic text represents a text which is generated automatically according to the viewer's interactions.

Reference is now made to FIG. 13, which illustrates an animated narrator 130 who manages the bidding process. The narrator 130 is located in front of an image of the product on sale 114 taken from the web page, and the scene also includes two moving tickers: at the bottom 132 and the top 134 of the frame. The ticker on the top 134 displays the time left for the bid (44.12 seconds in the picture above) and the name of the product. The ticker at the bottom 132 displays the current leading bid.

Scene 4: Intermission in the Bid

At a certain point in time no new requests for the bid are sent. The narrator needs to fill the time with more information. As with a TV broadcast there cannot be empty time where nothing happens. The system thus automatically chooses what to do during this empty slot.

The audio track continues with more information about the product, preferably taken from the Web site and enriched by the system. An example is the following text, which may be combined with the photographs as shown in FIG. 15:

"This ball has autographs of more than 20 Steelers including Jerome Bettis, Antwaan Randle, James Farrior, Joey Porter and of course Hines Ward who won Super Bowl forty M V P. Autographs were attained at a players party after the super bowl, where I personally met the gang.

All signatures are in great shape and guaranteed 100% authentic. <What a wonderful and sentimental addition to any serious NFL football collection!>"

Once again the text in the angle brackets was not originally in the site and was added by the system. The system displays pictures of the players which are mentioned in the site (Jerome Bettis, Antwaan Randle, James Farrior, Joey Porter and Hines Ward) although their pictures were not added by the seller and are not part of his product page. However the system may include a database of names (of people, places, events and more) and thus can identify that those are names of football players. The system can then either obtain their pictures from its own database or from the Internet (either from the NFL site or any other site using images search engine like Google). As above the images are preferably displayed in conjunction with interesting graphical transitions.

Scene 5: Second Part of the Bid

After the intermission the bid continues when more people place bids. An optional text may be as follows:

"Isaac from Boston offers 275 dollars! John J. from Pittsburgh Pa. offers 290 dollars! We're going 3, 2, 1 and . . . John J. from Pittsburgh Pa. is the winner! Great job John J., the <football> will be sent to you soon!"

Once again there are 3 types of text in this paragraph:
1. The text in the angle brackets (football in this case) is taken from the site.
2. The bold text is predefined by the system. Here too the system can use a database of similar phrases from which it can choose
3. The Italic text represents a text which is generated automatically according to the viewer's interactions.

Scene 6: Bid Summary and Wrap Up

In scene 6 the narration summarizes the bid and invites the viewer to ask for a notification on a future sale of a similar product. The system will then send an SMS or email or like notification to the viewer when a similar product is sold. The text for the scene is the following:

"Unbelievable! John J. from Pittsburgh has just bought a <Super Bowl Forty Steelers Team Autograph football.> Want to enjoy more sport related items? Click on the link below to get a reminder . . . . See you next time!"

The 3 types of text are as specified above.

A screen such as that shown in FIG. 15 may be displayed.

The above example, of a video shopping channel based on eBay is just for illustration. It is easy to see that the creative alternatives for generating the video are endless. The system can be set for scenes different than the five presented above, or in different order. Also, there are numerous creative decisions such as the text itself, the graphical transition, the look & feel, the voice of the narrator, the way he looks, what he dresses, should the narrator be male or female, how many narrators, whether or not to include tickers and their visual appearance and the text they contain, the way the pictures are laid out, and these are just a few examples. All such creative decisions may be set by the system according to predefined settings of a human user working via the authoring tool, and using real time decisions. The system may be flexible enough to allow any creative settings in terms of script and graphics. Also, the system is generic and flexible enough to generate any type of content, not necessarily for shopping.

Reference is now made to FIG. 16A which shows a VSML block comprising media elements having parameters, and the parameters having ruled, system or static attributes, as is explained in the following.

In every video scene there can be hundreds if not thousands of creative decisions regarding scene attributes. Possible decisions include:

Which segments (sub scenes) are included and in which order

Design (which graphics to use), e.g. avatars, background graphics, and more

General look and feel, e.g. transitions, camera movement style, colors, and more The creative person who works on a certain project can set each of those attributes as one of the following:

Static attribute—such an attribute remains the same for all video scenes generated in the project Ruled attribute—the decision regarding a ruled attribute may be determined according to a rule attached to it System attribute—the value of a system attribute is determined automatically by the system. The system can run different functions over such attributes. The user can define which function is activated for a given attribute, e.g. a function which chooses the value in order to create variation between scenes or within the same scene, as explained in greater detail below.

Following is an example of a VSML block. A block is an entity within the VSML which represents a collection of media elements with different types of attributes. Note the following:

Block/media element attribute: static—means the block/media element will always be displayed; ruled—means that it will displayed only if the rule yields a true result; system—means that the system will decide whether to display the block/media element or not.

Media file attributes: while the media element is the logical media (e.g. sound track) the media file is the actual file to use. So the media element attribute defines whether or not to include a sound track, while the media file attribute defines which audio file to use as the sound track, on the assumption that a sound track is to be included.

Media parameters attributes: parameters which defines how the media may be played, e.g. Image effects, ticker text font, ticker speed, TTS pitch level, and so on.

The more static attributes there are, the more alike the different scenes will be. Thus it is recommended that the creative person defines as many attributes as possible as ruled or as system attributes so as to create a large variation between the scenes.

Reference is now made to FIG. 16B which shows how the auction part of the eBay video scene is implemented in the VSML.

Alternating scenes are defined of narrator and filler, or enhancement. The narrator appears whenever there is a bid and the filler appears when there is not. The tickers are always visible.

The enhancement blocks are conditional blocks, that is to say they appear only if there are no new bids.

The enhancement blocks show images from the page or relevant pictures from a separate database with a block transition. In this example the images are layered one on top the other.

The images and narrated text of the enhancement blocks come from a plugin which obtains the media on the fly.

The background graphics media element refer to a static media

The product image is obtained through a plugin which obtains the image from the Web site.

The tickers and narrated text also are displayed through a plugin which sets the text dynamically according to user's input.

The duration of each block is determined dynamically in way which limits the total duration of the auction.

Reference is now made to FIG. 17 which shows a biographical web page and illustrates an automatically generated video sequence for a different kind of website. The example illustrates how elements from the web page of FIG. 17, a typical page of a social networking site, specifically the well-known MySpace social networking website, can be used as building blocks for the system to generate video. Additional major networking sites include bebo.com, facebook.com, friendster.com and more. At MySpace, end users can create their own pages, design it as they wish, write about themselves and their hobbies, and link to other friends who also have their own pages on MySpace.

The idea of generating video out of such pages is to allow MySpace users to express themselves in other ways than just via their page. Video is an intriguing type of media, and having a personal video, created automatically and designed professionally holds great merit. Professional video is hard to create and can be generated only by professionals. For most people, creating high quality video is simply impossible. The present embodiments enable end users who know nothing about professional video editing, to create their own personal videos, and then distribute them on the Web or via their mobile phone or using any other medium, simply by having created a web page.

It is also possible to provide the user a simple wizard in which he/she can control the content of the video. For example, the end user may record his/her own voice and add the audio file to the video, or choose a genre according to which the video may be generated, choose avatars to be used in the video, and so on.

Considering the web page in FIG. 17 in greater detail, the media elements on the page which can be used to generated video are marked with numbers on the screenshot and are referenced as follows:

1. Picture of the page owner (additional pictures are also accessible by clicking on the picture)
2. Page owner slogan (in this case—"super cool")
3. Personal details, in this case:
   Female
   24 years old
   Antwerpen, Belgium
4. Last time page owner logged in
5. Text page owner wrote about his/her self
6. Name of the page owner
7. Page owner's comments on music
8. Page owner's comments on movies
9. Page owner's comments on TV shows
10. Page owner's comments on Books
11. Heroes of the page owner
12. Friends of the page owner from the site
13. Comments of those friends
14. His/her material status
15. Why page owner created the page
16. Sexual orientation
17. Body type
18. Zodiac sign
19. Whether the page owner smokes or drinks The system according to the present embodiments can generate numerous video clips from the media elements. One way to generate video from the page of FIG. 17 is to create a kind of a hosting show in which two narrators present the hero, who is the owner of the page. Below is a list of possible scenes in such a video:

Opening
Introduction of the hero (the page owner)
Hero's personal details such as material status and sexual orientation
Hero telling about his/her self
Hero's favorite movies
Hero's friends
Ending Each of the scenes may have its own sound track with different music to create diversity and interest.

Scene 1: Opening

Figure 19:

An opening animation, for example as shown in FIG. 18, fades to a studio in which two narrators (Pete and Melissa) are standing. The camera zooms in to Pete (the male narrator) as shown in FIG. 19, who says:

"Welcome to myspace, a place for friends."

The bold text may be replaced with other phrases such as "hello to all and welcome to myspace" or "welcome all, we have a special girl tonight with us" and so on.

Scene 2: Introduction

The narrator continues: "Give a warm welcome for <Daria>. <She> is <24> and lives in <Antwerpen Belguim>. Mellisa, what else can you tell us about this wonderful <girl>?"

The text in the brackets represents data coming from the site. The other text may be replaced with textual substitutes. In this case, the name, age, home place and gender are taken from the relevant location on the original page.

As shown in FIG. 19, pictures of Daria, the owner of the web page of FIG. 17, are presented while the narrator recites her details While the narrator tells about her place of residence, a map may for example be displayed, which shows, or better still homes in on, the country and then city in which she lives.

Figure 20:
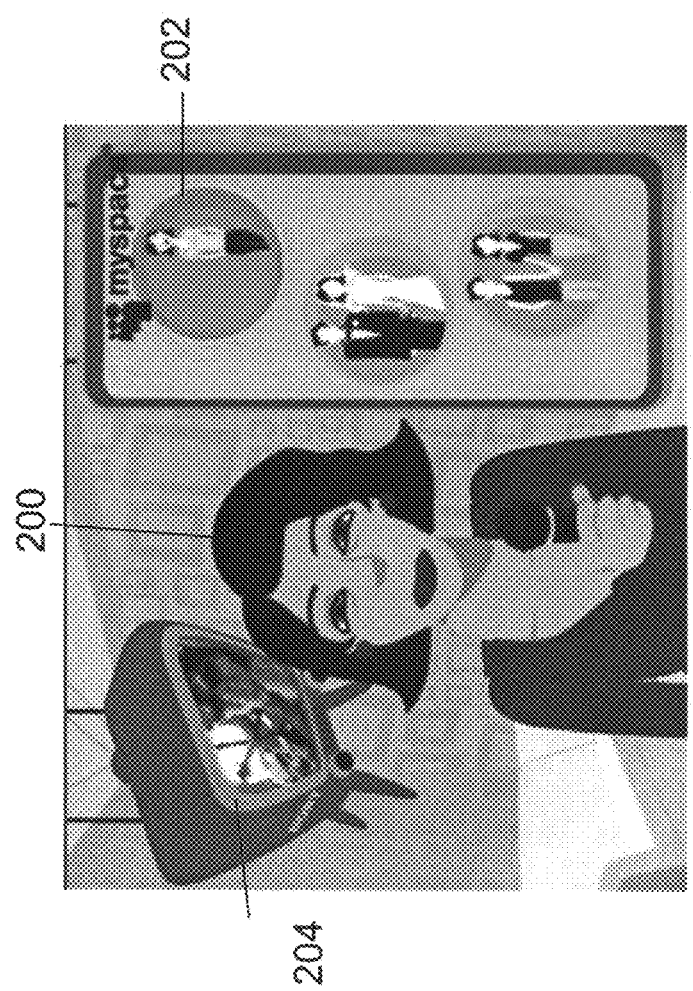

Reference is now made to FIG. 20 which shows the female narrator, Mellissa, 200 speaking. The female narrator (Melissa) says: "Thank you Pete, I do have some interesting info about <Daria>. As you can see <she> is <single at the moment>, <she> is <straight>, <she> <doesn't smoke or drink> but she does love having a good time. I have to tell you Pete she is a real catch for all you men out there".

While Melissa is telling different details about Daria, icons are displayed which demonstrate those details. In FIG. 20, for example, icon 202 is highlighted as it is being presently discussed. The fact the Daria is single is demonstrated in the highlighted icon.

While Melissa speaks, images of Daria are displayed on the TV 204, located behind Melissa's head. The images may be changed using selected transitions.

Scene 4: Hero is Telling about him/her Self

Figure 21:

Reference is now made to FIG. 21 which shows the focus having returned to the first narrator, Pete. As a creative interlude, the images used beforehand are shown being removed by an animated workman. Pete now says: "Thanks Melissa, <she> does sound great. We will soon meet <Daira>'s friends, you won't believe who is there. But first, let's hear what Daria has to say about <herself>"

Figure 22:

With reference to FIG. 22, the scene switches to a theater hall in which Daria's pictures are displayed one after the other. The soundtrack is an electronically generated narration of Daria talking about herself. The text that she is reciting is taken from the section in the site in which she writes general text about herself. A text-to-speech engine is used to render her voice:

"<Hey I'm Daria. I really enjoy making friends. I am a very good listener. I love animals, especially my cute dog nikkie. my friends say that I'm a spicy Belgium girl, Although I cant stand spicy food>"

Pete 2200 and Melissa 2202 sit in the theater and watch the film in which Daria tells about herself. A product placement 2204 is available to place advertising logos on the chairs.

Scene 5: Hero's Favorite Movies

Figure 23:
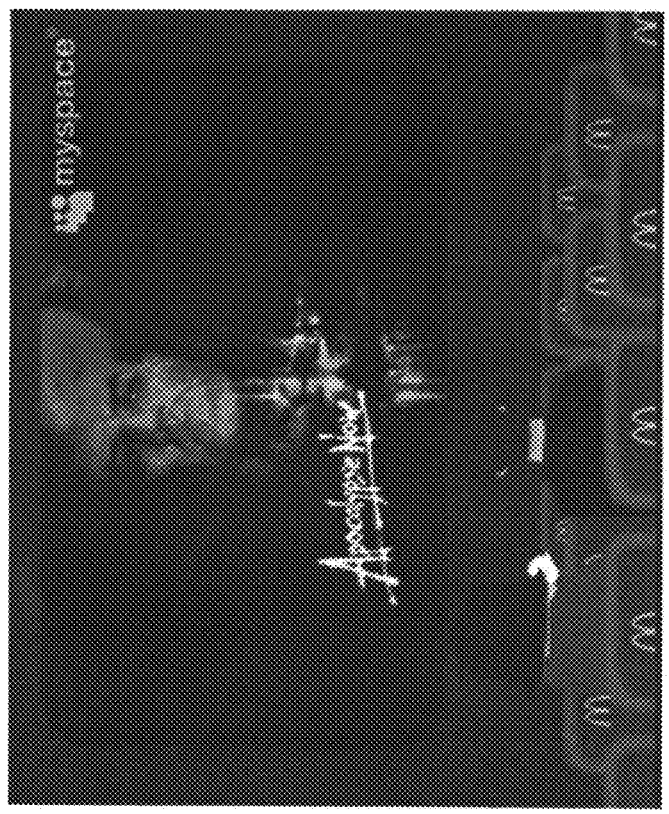
Figure 24:
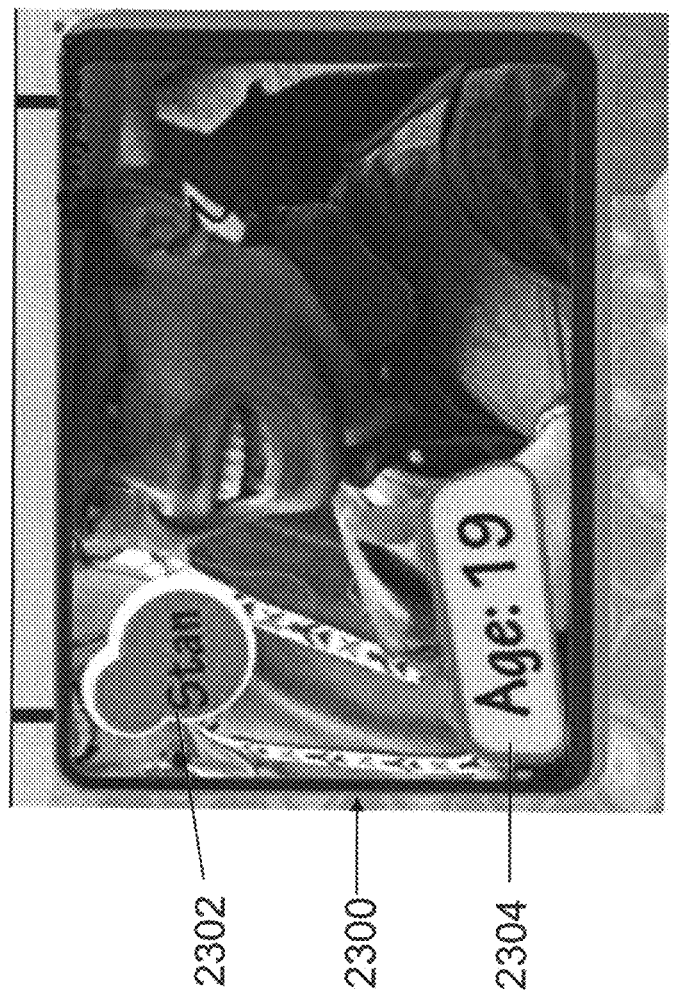

Reference is now made to FIG. 23. The film theater remains the setting for a scene in which the movies which Daria likes most are displayed. Pete and Melissa still sit in the theater hall. Initially there is a zoom on Pete who says:

"<Daria> also likes going to the movies. Here are some of her all time favorites"

The posters of Daria's favorite movies are displayed on the screen with a selected transition between them Scene 6: Hero's Friends Reference is now made to FIG. 24, which is a view from scene 6 in which Daria's friends from the site are shown. The scene zooms in on Pete who says:

"Well, now we are sure you will join <Daria's> friends. So let's see who is already there"

While the friend's images 2300 are displayed, two captions 2302 and 2304 are placed on the image which indicate the friend's name and age. As explained above an image analysis component identifies the location of the face so that the captions do not obscure the face. The soundtrack of this scene is a song about friendship.

Scene 7: Ending

In an ending scene, Pete narrates:

"Well that's all for now, see you next time on myspace"

Pete and the studio fade into an ending animation.

Note that an item can be represented by multiple Web pages and not necessarily by one. In the example above, most of Daria's pictures are taken from another page which is linked from the main page of Daria. Similarly, Information about Daria's friends, such as their names and ages, can be taken from their personal pages, which are also linked from Daria's page.

The above is just a simple example illustrating a video which can be generated from a myspace page. The video in this example is based on a hosting show concept. However the number of alternative possibilities for representing the same page is huge. Following are additional concepts for scripts which might be used:

Science fiction: aliens are invading earth, the first thing that they see is Daria's page, through which they learn about human beings
Film noir: Daria is lost, a detective is trying to find her and looking for clues in her page
Adventures: a thief breaks into Daria's home and see her hobbies and details Naturally, the options are endless. Also, each concept holds a great deal of alternatives. For example, in the hosting show, it is possible to display additional scenes, such as:

Daria's favorite music
Daria's favorite books
Daria's favorite TV shows
Daria's favorite Heros
Comments from Daria's friends In addition, the narrators, soundtrack, background setting and all the other objects in the video may be replaced with others. Also, the look and feel of the video need not necessarily be of a cartoon. Alternatives include talking socks, plasticine figures and objects or even realistic figures, in a background taken from real video of a TV studio. In other words, the number of alternatives for generating video out of a page taken from a social networking site are endless. The present embodiments provide a tool for the user's creativity.

It is expected that during the life of this patent many relevant devices and systems will be developed and the scope of the terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Apparatus for generation of playable media from structured data, comprising:
    a spatially structured data reading unit for reading in of content comprising a plurality of distinct media elements distributed over a first, spatial, structure,
    a spatial to linear transformation unit for transforming said distinct media elements from said spatial structure into a second, linear, structure, said transformation comprising incorporating media play instructions defining a time-line relationship between said spatially distributed distinct media elements, thereby to form said linear structure, and
    a rendering unit for rendering said content from said second, linear, structure using said media play instructions to generate playable media from said content.

2. Apparatus according to claim 1, wherein said spatial structure comprises said distinct media elements arranged in at least two dimensions, and said playable media is a linear media, said transformation unit being configured such that said second structure is a linear description of said first structure.

3. Apparatus according to claim 1, wherein said transformation unit is configured for enforcing a linearity on said first structure in order to form said second structure.

4. Apparatus according to claim 1, wherein said playable media is video and said second structure comprises a plurality of scenes.

5. Apparatus according to claim 4, wherein said media play instructions comprise scene change instructions, and said transformation into said second structure further comprises inserting scene change instructions between respective scenes.

6. Apparatus according to claim 5, wherein said transformation is configured to apply to said second structure a timing framework for timing of play of said linear media.

7. Apparatus according to claim 1, wherein said content is at least partly updated dynamically and said structured data reading unit is configured to read data in dynamically and pass to said transformation unit for dynamic transformation.

8. Apparatus according to claim 1, wherein said content comprises data of dynamically generated web pages, and said structured data reading unit is configured to use an API of a content management system managing said dynamically generated web pages to obtain said data.

9. Apparatus according to claim 1, wherein said first structure comprises content fitted within a predetermined format, and said transformation unit comprises a parsing unit for parsing said content based on said predetermined format.

10. Apparatus according to claim 9, wherein said predetermined format comprises content items and wherein said parsing unit is configured to recognize content belonging to said content items.

11. Apparatus according to claim 10, wherein said media play commands comprise at least one enhancement instruction for providing additional play to link between content items.

12. Apparatus according to claim 10, wherein said media play commands comprise at least one enhancement instruction for providing additional play within respective content items.

13. Apparatus according to claim 1, wherein said media play instructions comprise an instruction for generating a graph from tabulated data.

14. Apparatus according to claim 1, wherein said structured data comprises text, and wherein said media play instructions comprise an instruction for conversion of text to speech.

15. Apparatus according to claim 14, wherein said media play instructions comprise an instruction for reading of said speech by an animated character.

16. Apparatus according to claim 15, wherein said media play instructions comprise an instruction for selection between a plurality of alternative animated characters for said reading.

17. Apparatus according to claim 16, wherein said transformation unit is configured to make a selection between said alternative animated characters based on a parsing of a content of said structured data.

18. Apparatus according to claim 1, wherein said structured data comprises at least one image, and wherein said media play instructions comprise an instruction for displaying said image for a predetermined amount of time.

19. Apparatus according to claim 1, wherein said structured data comprises at least one image combined with information and wherein said media play instructions comprise an instruction for displaying said image with said information superimposed thereon.

20. Apparatus according to claim 1, wherein said structured data comprises a plurality of images and wherein said transformation unit is configured with an image selector for selecting a subset of said images for display.

21. Apparatus according to claim 20, wherein said selector is configured to make said selection based on processing of respective images to determine suitability.

22. Apparatus according to claim 1, wherein said structured data comprises a plurality of images and wherein said media play instructions comprise a slideshow instruction for playing said images in succession.

23. Apparatus according to claim 19, wherein said transformation unit comprises an image analysis unit for determining the locations of critical regions within images and wherein said media play instruction for displaying said image with said information superimposed thereon is modifiable to ensure that said information is located so as to avoid obscuring detected critical regions.

24. Apparatus according to claim 1, wherein said transformation unit comprises a parsing unit for parsing content data of said first data structure, and a configuration unit associated with said parsing unit for configuring said parsing unit for said first data structure.

25. Apparatus according to claim 1, wherein said media play instructions comprise camera control instructions for changing a point of view of said media play.

26. Apparatus according to claim 1, wherein said media play instructions comprise scene change instructions.

27. Apparatus according to claim 26, wherein said scene change instructions comprise at least one instruction of the group consisting of cut, fade and merge.

28. Apparatus according to claim 1, wherein said transformation unit comprises a selector for selecting between a plurality of different play possibilities.

29. Apparatus according to claim 28, wherein said selector is configured to initially make said selecting on a substantially random basis, thereby to provide different play versions of the same media for delivery over a network to recipients.

30. Apparatus according to claim 29, further comprising a feedback unit for receiving feedback from recipients indicating levels of interest in the respective versions, said feedback unit being configured to optimize said selector for making selections indicated as preferred from said feedback.

31. Apparatus according to claim 29, further comprising a feedback unit for receiving feedback from recipients indicating levels of interest in the respective versions, said feedback unit being configured to select versions indicated as preferred by said feedback for future sending to recipients.

32. Apparatus according to claim 28, wherein said transformation unit comprises a mapping unit for mapping said structured data from said first structure into a tree, said tree comprising branches, and said selector is configured to select between all of said branches or one or more subsets of said branches for said second structure.

33. Apparatus according to claim 32, wherein said selector is configured to use an importance index based on content of said structured data in order to select between said branches.

34. Apparatus according to claim 33, wherein said importance index comprises importance indices for respective branches.

35. Apparatus according to claim 1, wherein said playable media is video.

36. Apparatus according to claim 1, wherein said playable media is audio.

37. The apparatus of claim 1, further comprising:
a mark up unit for adding media playing instructions to said spatially structured content, as mark up about said content, and
and wherein said rendering unit is configured for converting said content, according to instructions contained in said mark up, into said playable sequence.

38. The linear media generation apparatus of claim 37, configured for distributed playing about said web by locating said rendering unit at a client and transmitting said marked up media to said client.

39. Apparatus according to claim 37, wherein said content comprises data arranged in at least two dimensions, and said playable sequence is a linear media, said markup unit being configured such that said marked up content is a linear description of said content.

40. Apparatus according to claim 39, wherein said mark up is configured to apply to said marked up content a timing framework for timing of play of said linear media.

41. Apparatus according to claim 37, wherein said content is at least partly updated dynamically and said mark up unit is configured to read data in dynamically and mark up said data dynamically.

42. Apparatus according to claim 37, wherein said content comprises data of dynamically generated web pages, and said mark up unit is configured to use an API of a content management system managing said dynamically generated web pages to obtain said content.

43. Apparatus according to claim 37, wherein said content is fitted within a predetermined format, and said mark up unit comprises a parsing unit for parsing said content based on said predetermined format.

44. Apparatus according to claim 43, wherein said predetermined format comprises content items and wherein said parsing unit is configured to recognize content belonging to said content items.

45. Apparatus according to claim 44, wherein said media play commands comprise at least one enhancement instruction for providing additional play to link between content items.

46. Apparatus according to claim 44, wherein said media play commands comprise at least one enhancement instruction for providing additional play within respective content items.

47. Apparatus according to claim 37, wherein said media play instructions comprise an instruction for generating a graph from tabulated data.

48. Apparatus according to claim 37, wherein said content comprises text, and wherein said media play instructions comprise an instruction for conversion of text to speech.

49. Apparatus according to claim 48, wherein said media play instructions comprise an instruction for reading of said speech by an animated character.

50. Apparatus according to claim 49, wherein said media play, instructions comprise an instruction for selection between a plurality of alternative animated characters for said reading.

51. Apparatus according to claim 50, wherein said transformation unit is configured to make a selection between said alternative animated characters based on a parsing of a content of said structured data.

52. Apparatus according to claim 37, wherein said structured data comprises at least one image, and wherein said media play instructions comprise an instruction for displaying said image for a predetermined amount of time.

53. Apparatus according to claim 37, wherein said structured data comprises at least one image combined with information and wherein said media play instructions comprise an instruction for displaying said image with said information superimposed thereon.

54. Apparatus according to claim 37, wherein said structured data comprises a plurality of images and wherein said transformation unit is configured with an image selector for selecting a subset of said images for display.

55. Apparatus according to claim 54, wherein said selector is configured to make said selection based on processing of respective images to determine suitability.

56. Apparatus according to claim 37, wherein said content comprises a plurality of images and wherein said media play instructions comprise a slideshow instruction for playing said images in succession.

57. Apparatus according to claim 53, wherein said transformation unit comprises an image analysis unit for determining the locations of critical regions within images and wherein said media play instruction for displaying said image with said information superimposed thereon is modifiable to ensure that said information is located so as to avoid obscuring detected critical regions.

58. Apparatus according to claim 37, wherein said transformation unit comprises a parsing unit for parsing content of different data structures, and a configuration unit associated with said parsing unit for configuring said parsing unit for respectively different data structures.

59. Apparatus according to claim 37, wherein said media play instructions comprise camera control instructions for changing a point of view of said media play.

60. Apparatus according to claim 37, wherein said media play instructions comprise scene change instructions.

61. Apparatus according to claim 60, wherein said scene change instructions comprise at least one instruction of the group consisting of cut, fade and merge.

62. Apparatus according to claim 37, wherein said transformation unit comprises a selector for selecting between a plurality of different play possibilities.

63. Apparatus according to claim 62, wherein said selector is configured to initially make said selecting on a substantially random basis, thereby to provide different play versions of the same media for delivery over a network to recipients.

64. Apparatus according to claim 63, further comprising a feedback unit for receiving feedback from recipients indicating levels of interest in the respective versions, said feedback unit being configured to optimize said selector for making selections indicated as preferred from said feedback.

65. Apparatus according to claim 63, further comprising a feedback unit for receiving feedback from recipients indicating levels of interest in the respective versions, said feedback unit being configured to select versions indicated as preferred by said feedback for future sending to recipients.

66. Apparatus according to claim 62, wherein said transformation unit comprises a mapping unit for mapping said content into a tree, said tree comprising branches, and said selector is configured to select between all of said branches or one or more subsets of said branches for said second structure.

67. Apparatus according to claim 66, wherein said selector is configured to use an importance index based on content of said structured data in order to select between said branches.

68. Apparatus according to claim 67, wherein said importance index comprises importance indices for respective branches.

69. Apparatus according to claim 37, wherein said playable sequence is video.

70. Apparatus according to claim 37, wherein said playable sequence is audio.

71. Apparatus according to claim 37, further comprising a combiner for combining separate sequences into a channel.

72. A storage system for storing media content in play ready fashion comprising:
an input unit for input of content comprising a plurality of distinct media elements in a spatial structure, and
a markup unit for marking up said content with media play instructions, said media play instructions including a timing schedule to provide a linear relationship between said elements, to render said spatial structure into a linear structure for sequential play.

73. A method for generation of playable media from structured data, comprising:
reading in of content data comprising a plurality of distinct elements spatially distributed in a first, spatial, structure,
transforming said content data into a second, linear, structure, said transforming comprising incorporating media play instructions for sequential play of said elements, and
rendering said structured data from said second structure using said media play instructions to generate playable media from said content data.

* * * * *